United States Patent
Chung et al.

(10) Patent No.: US 8,442,581 B2
(45) Date of Patent: May 14, 2013

(54) SYSTEM FOR THE COEXISTENCE BETWEEN A PLURALITY OF WIRELESS COMMUNICATION MODULES

(75) Inventors: Yuan-Hung Chung, Hsinchu County (TW); Hong-Kai Hsu, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 631 days.

(21) Appl. No.: 12/686,424

(22) Filed: Jan. 13, 2010

(65) Prior Publication Data

US 2010/0311339 A1  Dec. 9, 2010

Related U.S. Application Data

(60) Provisional application No. 61/184,358, filed on Jun. 5, 2009.

(51) Int. Cl.
*H04M 1/00* (2006.01)
(52) U.S. Cl.
USPC ............. 455/552.1; 455/127.4; 455/63.3; 455/13.3; 370/280
(58) Field of Classification Search ........... 455/552.1, 455/127.4, 63.3, 13.3, 168.1, 17, 83, 78; 370/280
See application file for complete search history.

(56) References Cited

U.S. PATENT DOCUMENTS

| | | | | |
|---|---|---|---|---|
| 5,038,113 A * | 8/1991 | Katz et al. | ............... | 330/277 |
| 5,966,048 A * | 10/1999 | Thompson | ............... | 330/124 R |
| 6,185,434 B1 | 2/2001 | Hagstrom et al. | | |
| 6,643,522 B1 * | 11/2003 | Young | ............... | 455/552.1 |
| 6,826,162 B2 | 11/2004 | Haines et al. | | |
| 6,970,681 B2 | 11/2005 | Darabi et al. | | |
| 7,376,446 B2 * | 5/2008 | Licht | ............... | 455/561 |
| 7,446,626 B2 | 11/2008 | Gorbachov | | |
| 7,496,060 B2 | 2/2009 | Ramirez et al. | | |
| 7,499,678 B2 * | 3/2009 | Shibagaki et al. | ............... | 455/82 |

(Continued)

FOREIGN PATENT DOCUMENTS

| | | |
|---|---|---|
| CN | 101252757 | 8/2008 |
| CN | 101253735 | 8/2008 |

(Continued)

OTHER PUBLICATIONS

English language translation of abstract of CN 101252757 (published Aug. 27, 2008).

(Continued)

*Primary Examiner* — Minh D Dao
(74) *Attorney, Agent, or Firm* — McClure, Qualey & Rodack, LLP

(57) ABSTRACT

A system for the coexistence between wireless communication modules sharing an antenna is disclosed. A wireless communication chipset includes a first wireless communication module capable of transmitting and receiving first wireless communication signals, a second wireless communication module capable of transmitting and receiving second wireless communication signals and a combine-separate unit capable of generating a first combined signal and separating a second combined signal. The switching device is configured to selectively transmit the first combined signal or receive the second combined signal. The connection device has a first port coupled to an antenna, a second port connected to the first port for transmitting the first combined signal or receiving the second combined signal, and a third port connected to the first port for transmitting or receiving the second wireless communication signals via the second path and the antenna.

19 Claims, 28 Drawing Sheets

U.S. PATENT DOCUMENTS

| | | | |
|---|---|---|---|
| 7,561,852 B2 | 7/2009 | Darabi et al. | |
| 8,089,906 B2 * | 1/2012 | Poulin et al. | 370/280 |
| 8,155,612 B1 | 4/2012 | Husted et al. | |
| 2002/0053947 A1 | 5/2002 | Macedo | |
| 2004/0192222 A1 | 9/2004 | Vaisanen et al. | |
| 2006/0030265 A1 | 2/2006 | Desai et al. | |
| 2006/0194600 A1 | 8/2006 | Palin et al. | |
| 2007/0021066 A1 | 1/2007 | Dravida et al. | |
| 2007/0117558 A1 | 5/2007 | Balwani | |
| 2007/0224936 A1 | 9/2007 | Desai | |
| 2008/0102760 A1 * | 5/2008 | McConnell et al. | 455/73 |
| 2008/0119145 A1 * | 5/2008 | Lee et al. | 455/101 |
| 2008/0123610 A1 | 5/2008 | Desai et al. | |
| 2008/0130603 A1 | 6/2008 | Wentink et al. | |
| 2008/0139118 A1 | 6/2008 | Sanguinetti | |
| 2008/0162668 A1 * | 7/2008 | Miller | 709/219 |
| 2008/0192806 A1 | 8/2008 | Wyper et al. | |
| 2008/0253345 A1 | 10/2008 | Sanguinetti | |
| 2008/0279138 A1 | 11/2008 | Gonikberg et al. | |
| 2009/0170447 A1 * | 7/2009 | Marlett et al. | 455/82 |
| 2009/0239471 A1 | 9/2009 | Tran et al. | |
| 2009/0258607 A1 | 10/2009 | Beninghau et al. | |
| 2010/0008252 A1 | 1/2010 | Alve | |
| 2010/0137024 A1 * | 6/2010 | Maguire | 455/552.1 |
| 2010/0210299 A1 | 8/2010 | Gorbachov | |
| 2010/0259319 A1 * | 10/2010 | Chan et al. | 327/563 |
| 2010/0262987 A1 | 10/2010 | Imanilov | |
| 2011/0163921 A1 * | 7/2011 | Chirila | 343/702 |
| 2011/0204990 A1 * | 8/2011 | Stockstad | 333/25 |
| 2012/0026061 A1 * | 2/2012 | Shachar | 343/859 |
| 2012/0062366 A1 * | 3/2012 | Pappu et al. | 340/10.1 |
| 2012/0069756 A1 * | 3/2012 | Ji et al. | 370/252 |
| 2012/0075072 A1 * | 3/2012 | Pappu | 340/10.1 |
| 2012/0171968 A1 * | 7/2012 | Poulin et al. | 455/78 |

FOREIGN PATENT DOCUMENTS

| | | |
|---|---|---|
| TW | 2006 29938 | 8/2006 |
| TW | 200703939 | 1/2007 |
| WO | WO 2007/120945 | 10/2007 |

OTHER PUBLICATIONS

English language translation of abstract of CN 101253735 (published Aug. 27, 2008).

English language translation of abstract of TW 2006 29938 (published Aug. 16, 2006).

English language translation of abstract of TW 200703939 (published Jan. 16, 2007, p. 3 of publication).

* cited by examiner

SYSTEM FOR THE COEXISTENCE BETWEEN A PLURALITY OF WIRELESS COMMUNICATION MODULES

CROSS REFERENCE TO RELATED APPLICATIONS

This application claims the benefit of U.S. Provisional Application No. 61/184,358, filed on Jun. 5, 2009, the entirety of which is incorporated by reference herein.

BACKGROUND OF THE INVENTION

1. Field of the Invention

The invention relates generally to a chipset for the coexistence between a plurality of wireless communication modules, and more particularly, to a chipset for the coexistence between the plurality of wireless communication modules sharing a single or dual antennas.

2. Description of the Related Art

As shown in FIG. 1, a cellular phone may connect to a wireless local area network (WLAN) via a WLAN module thereof and simultaneously communicate with a Bluetooth handset (or a Bluetooth car audio, or others) through a Bluetooth module thereof. WLAN is typically implemented as an extension to wired local area networks (LANs) inside a building and is able to provide the last few meters of connectivity between a wired network and mobile or fixed devices. WLAN is based on the IEEE 802.11 standard. Most WLAN may operate in the 2.4 GHz license-free frequency band and have throughput rates of up to 2 Mbps. The 802.11b standard introduces direct sequence mechanism and provides throughput rates of up to 11 Mbps. The 802.11g standard operates at a maximum raw data rate of 54 Mbps, or about 19 Mbps net throughput. As shown in FIG. 1, an access point (AP) is connected to a LAN by an Ethernet cable. The AP typically receives, buffers, and transmits data between the WLAN and the wired network infrastructure. The AP may support, on average, twenty devices and have a coverage varying from 20 meters in an area with obstacles (walls, stairways, elevators etc) and up to 100 meters in an area with clear line of sight. Bluetooth is an open wireless protocol for exchanging data over short distances from fixed and mobile devices, creating personal area networks (PANs). Voice over internet protocol (VoIP) data from the Internet may be received through a WLAN connection and vice versa. A cellular phone may transmit voice data through an established PAN to the Bluetooth handset and receive speech signals captured by a microphone of the Bluetooth handset via the Bluetooth module. The cellular phone may transmit digital music through the established PAN to be played back in the Bluetooth handset. WLAN and Bluetooth both occupy a section of the 2.4 GHz Industrial, Scientific, and Medical (ISM) band, which is 83 MHz-wide. In light of cost issues as well as space used for component placement, modern electronic devices, such as cellular phones, Ultra-Mobile PCs (UMPCs) or others, are equipped with WLAN and Bluetooth modules sharing an antenna instead of multiple antennas.

Referring to FIG. 2, for example, Bluetooth uses Frequency Hopping Spread Spectrum (FHSS) and is allowed to hop between 79 different 1 MHz-wide channels in a Bluetooth spectrum. WLAN uses Direct Sequence Spread Spectrum (DSSS) instead of FHSS. Its carrier remains centered on one channel, which is 22 MHz-wide. When the WLAN module and the Bluetooth module are operating simultaneously in the same area, as shown in FIG. 1, the single WLAN channel, which is 22 MHz-wide, occupies the same frequency space as 22 out of 79 Bluetooth channels which are 1 MHz-wide. When a Bluetooth transmission occurs on a frequency band that falls within the frequency space occupied by an ongoing WLAN transmission, a certain level of interference may occur, depending on the signal strength thereof. Due to the fact that the WLAN module and Bluetooth module share the same spectrum and also share an antenna, avoiding interference therebetween is required.

FIG. 3 shows a diagram illustrating an operation conflict which may occur between a WLAN and a Bluetooth wireless communication service sharing an antenna. In FIG. 3, the shared antenna is switched between the WLAN and Bluetooth wireless communication services in a given time slot for transceiving data. Because the Bluetooth wireless communication service carries the audio data that requires real-time transmission, the Bluetooth wireless communication service has a higher priority over the WLAN wireless communication service. When a WLAN transceiving process takes place at the same time as a Bluetooth transceiving process, the WLAN transceiving process will be blocked. Referring to FIG. 3 again, the WLAN receiving operation (Rx operation) 1 occurs at a time slot when the Bluetooth wireless communication service remains idle. Therefore, the Rx operation 1 is performed without interference and an acknowledgement (ACK) message 2 is sent to the WLAN AP (such as the AP in FIG. 1) as a reply message after the Rx operation 1 is finished. Following the Rx operation 1, another WLAN Rx operation 3 occurs. The Rx operation 3 is also performed without interference because the Bluetooth wireless communication service is in the idle state. However, an ACK message 4 in response to the Rx operation 3 can not be replied to the WLAN AP, as the ACK message 4 will occupy the same time slot of the incoming Bluetooth transmitting operation (Tx operation). In this case, the Rx operation 3 would be deemed as failed. In light of the failure, the WLAN AP would increase a sliding window thereof and re-perform the Rx operation 3 with the increased sliding window in an attempt to successfully receive the ACK message. However, the re-performed Rx operation 3 (denoted as 34), which has a prolonged operation period, will be more likely to overlap with the Bluetooth transceiving time slot. This causes a further retry of the Rx operation 3, leading to a further decrement of the WLAN throughput. The performance degradation is caused by the inability of operating the WLAN and Bluetooth wireless communication services with an antenna at the same time.

BRIEF SUMMARY OF THE INVENTION

In light of the previously described problems, there exists a need for a system, in which a plurality of wireless communication services may share single or dual antennas for simultaneous operations.

An embodiment of the invention discloses a system for the coexistence between a plurality of wireless communication modules sharing an antenna, comprising a wireless communication chipset, a switching device and a connection device. The wireless communication chipset comprises a first wireless communication module capable of transmitting and receiving first wireless communication signals, a second wireless communication module capable of transmitting and receiving second wireless communication signals, and a combine-separate unit capable of generating a first combined signal by combining the first and second wireless communication signals and separating a second combined signal into the first and second wireless communication signals. The switching device is configured to selectively transmit the first combined signal or receive the second combined signal. The connection device has a first port coupled to the antenna, a second port connected to the first port via a first path for transmitting the first combined signal or receiving the second combined signal via the first path and the antenna, and a third port connected to the first port via a second path for transmitting or receiving the second wireless communication signals via the second path and the antenna.

Another embodiment of the invention discloses a system for the coexistence between a plurality of wireless communication modules sharing an antenna, comprising a wireless communication chipset and a switching device. The wireless communication chipset comprises a first wireless communication module capable of transmitting and receiving first wireless communication signals, a second wireless communication module capable of transmitting and receiving second wireless communication signals, and a combine-separate unit capable of generating a first combined signal by combining the first and second wireless communication signals and separating a second combined signal into the first and second wireless communication signals. The switching device is configured to selectively transmit the first combined signal or receive the second combined signal via the antenna.

Another embodiment of the invention discloses a system for the coexistence between a plurality of wireless communication modules sharing an antenna, comprising a wireless communication chipset and a connection device. The wireless communication chipset comprises a first wireless communication module capable of transmitting and receiving first wireless communication signals, a second wireless communication module capable of transmitting and receiving second wireless communication signals, and a combine-separate unit capable of generating a first combined signal by combining the first and second wireless communication signals and separating a second combined signal into the first and second wireless communication signals. The connection device has a first port coupled to the antenna, a second port connected to the first port via a first path for transmitting the first combined signal or receiving the second combined signal via the first path and the antenna, and a third port connected to the first port via a second path for transmitting or receiving the second wireless communication signals via the second path and the antenna.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
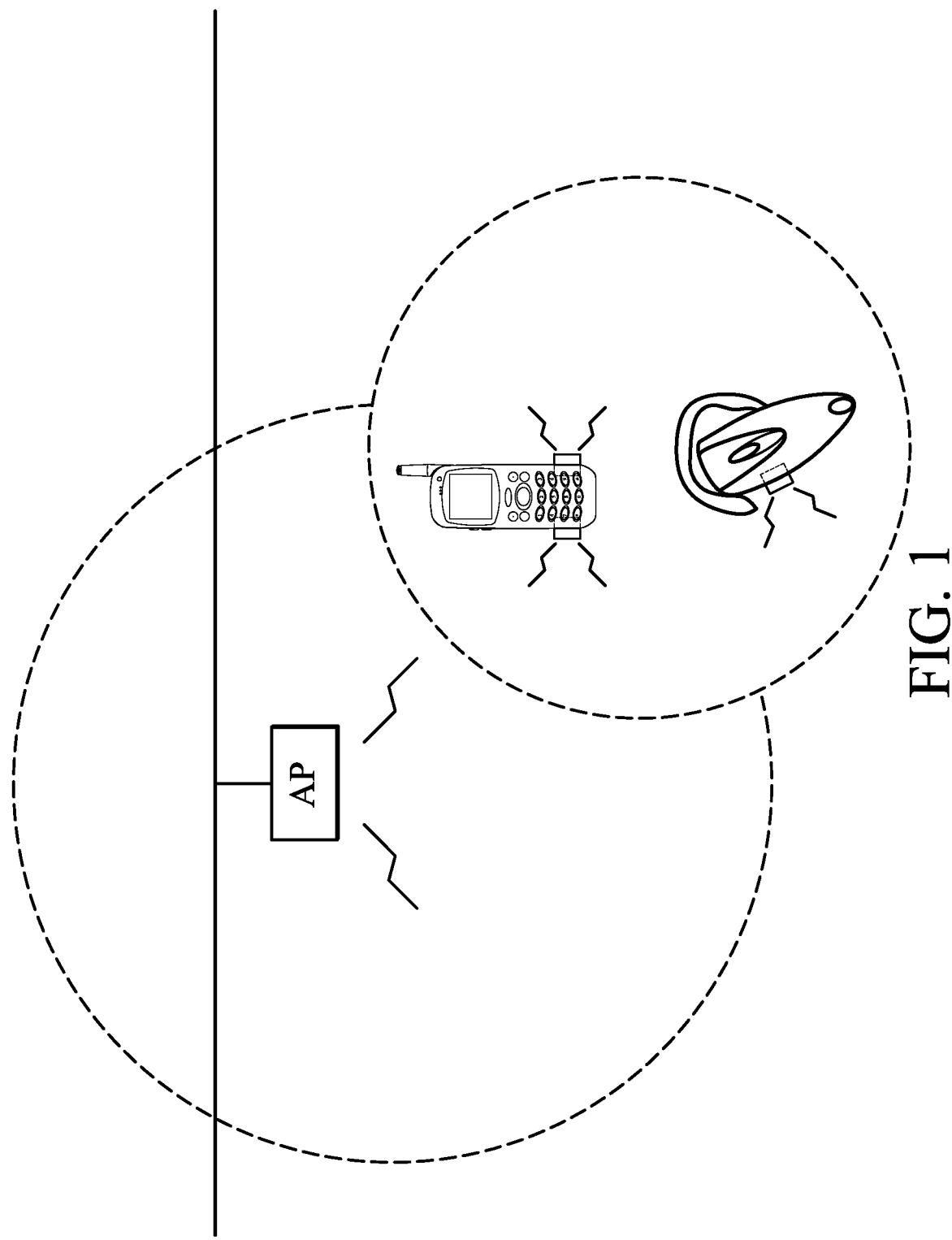
FIG. 1 shows a cellular phone connecting to a WLAN via a WLAN module thereof as well as communicating with a Bluetooth handset through a Bluetooth module thereof.
Figure 2:
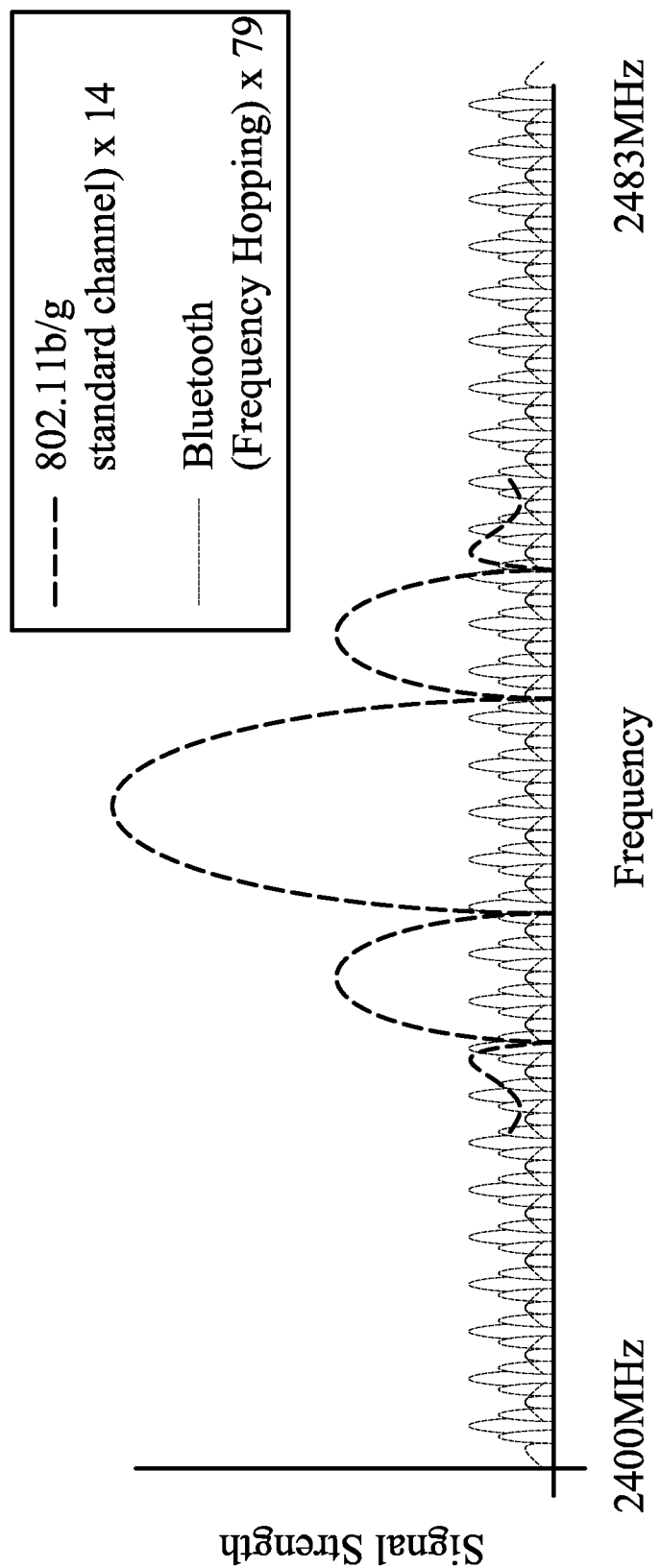
FIG. 2 shows a diagram of Bluetooth frequency Hopping.
Figure 3:
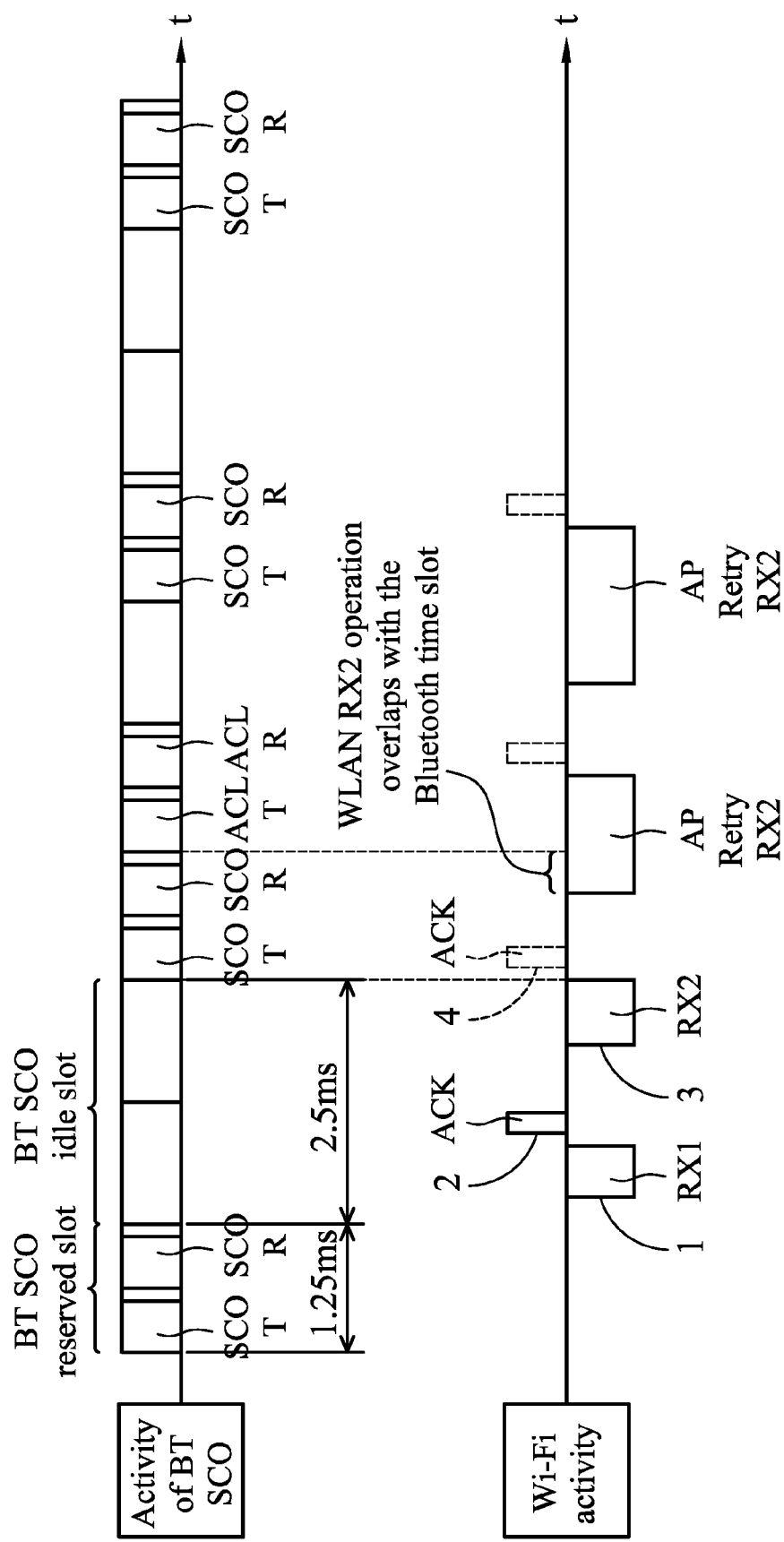
FIG. 3 shows a diagram illustrating an operation conflict between a WLAN and a Bluetooth wireless communication services sharing an antenna.
Figure 4:
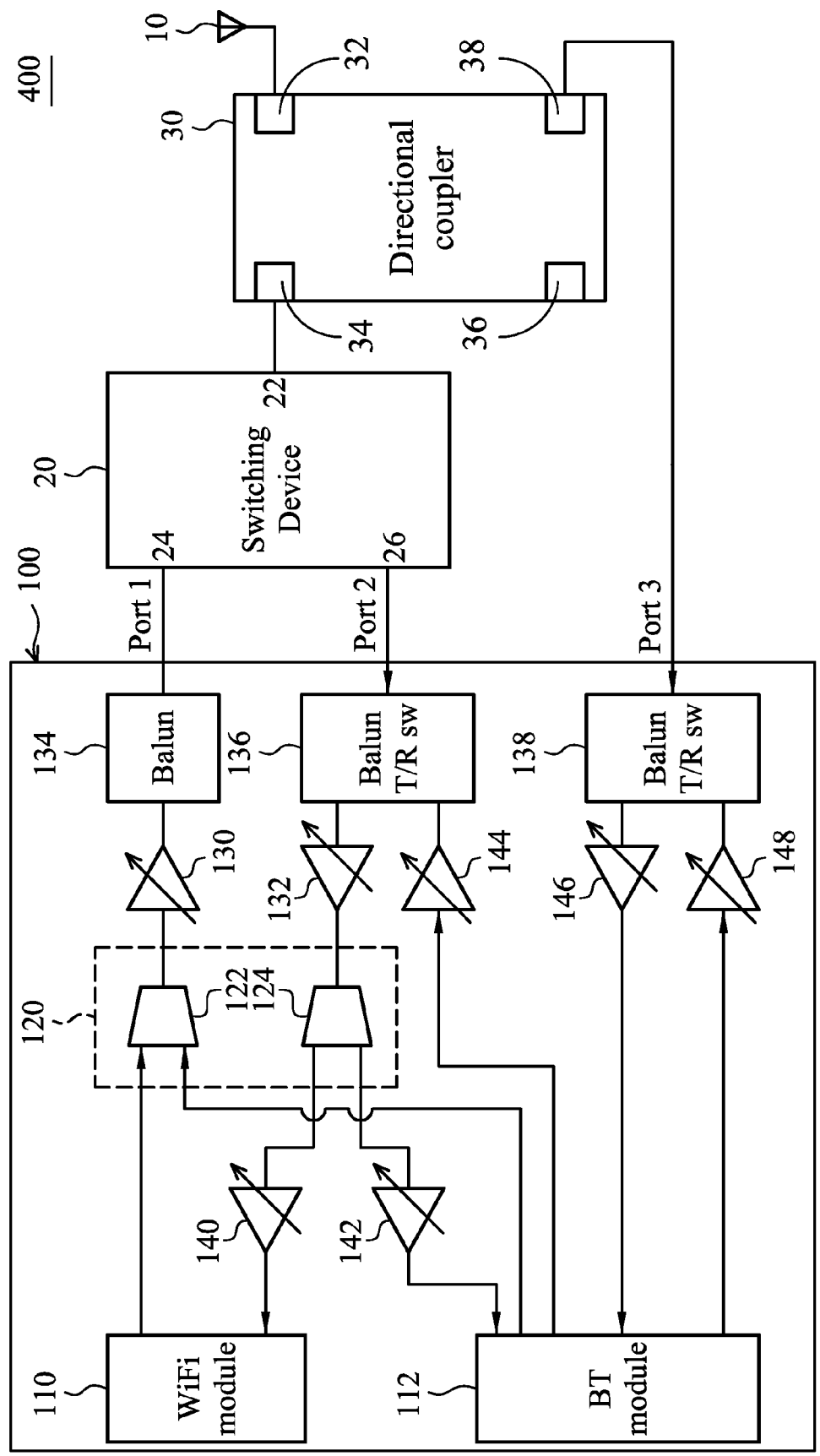
FIG. 4 depicts a diagram of a system for the coexistence between a plurality of wireless communication modules sharing an antenna according to an embodiment of the invention.

FIG. 4 depicts a diagram of a system for the coexistence between a plurality of wireless communication modules sharing an antenna according to an embodiment of the invention. The system 400 comprises a switching device 20, a directional coupler 30 (e.g., the connection device used in this embodiment) and a wireless communication chipset 100. The wireless communication chipset 100 comprises a Wireless Fidelity (WiFi) module 110, a Bluetooth module 112, a combine-separate unit 120, a power amplifier (PA) unit 130, a low noise amplifier (LNA) unit 132, a balun unit 134, a balun-switch unit 136, a balun-switch unit 138 and buffers 140, 142, 144, 146 and 148. The combine-separate unit 120 comprises a combiner 122 and a separator 124. The balun unit 134, the balun-switch units 136 and 138 are used to convert electrical signals that are balanced with respect to ground (differential) into signals that are unbalanced (single-ended) and vice versa. The balun unit 134 is connected through an input/output (I/O) port (port 1) of the wireless communication chipset 100. The balun-switch units 136 and 138 not only serve as additional I/O ports (ports 2 and 3) of the wireless communication chipset 100, but also has capabilities for transmitting and receiving wireless communication signals selectively. For example, each of the balun-switch units 136 and 138 can transmit the wireless communication signals from the BT module 112 to the antenna 10 or receive the wireless communication signals from the antenna 10 to the BT module 112, selectively.

Figure 5A:
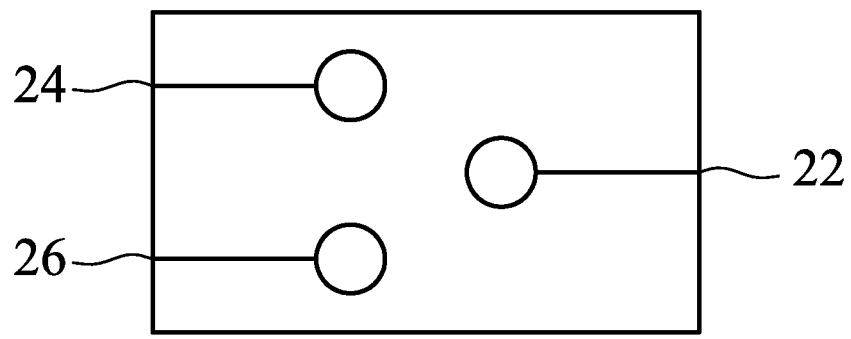
FIG. 5A depicts a diagram of a switching device implemented by a single-pole double-thrown (SPDT) switch according to an embodiment of the invention.
Figure 5B:
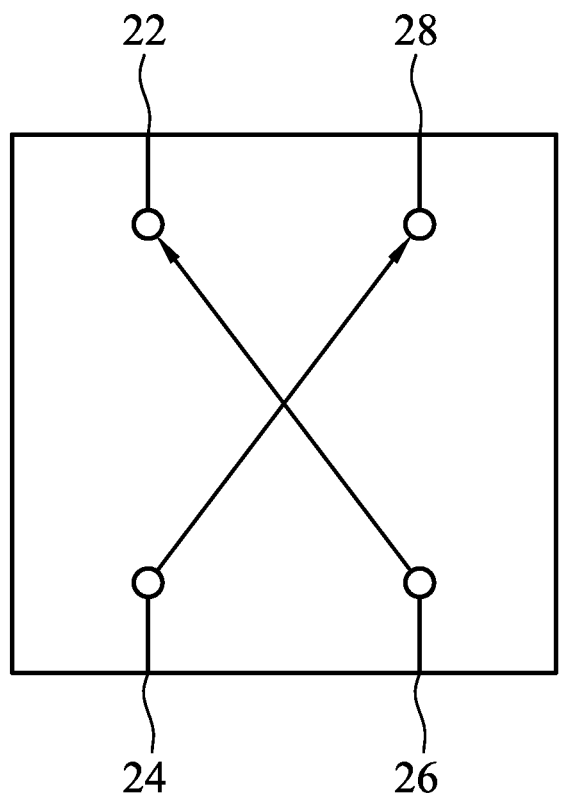
FIG. 5B depicts a diagram of a switching device implemented by a double-pole double-thrown (DPDT) switch according to an embodiment of the invention.

Referring to FIG. 5A, the switching device 20, which consists of three terminals 22, 24 and 26, is configured to selectively connect the terminal 22 to the terminal 24 or 26. The switching device 20 may be implemented by a single-pole double-thrown (SPDT) switch, as shown in FIG. 5A. In addition, the switching device 20 may also be implemented by a double-pole double-thrown (DPDT) as shown in FIG. 5B. The terminal 24 is selectively connected to the terminals 22 or 28, and the terminal 26 is selectively connected to the terminals 22 or 28. The terminal 28 may be coupled or connected to an external node for impedance matching. The terminals 24 and 26 are connected to the ports 1 and 2 of the wireless communication chipset 100, respectively.

Figure 6:
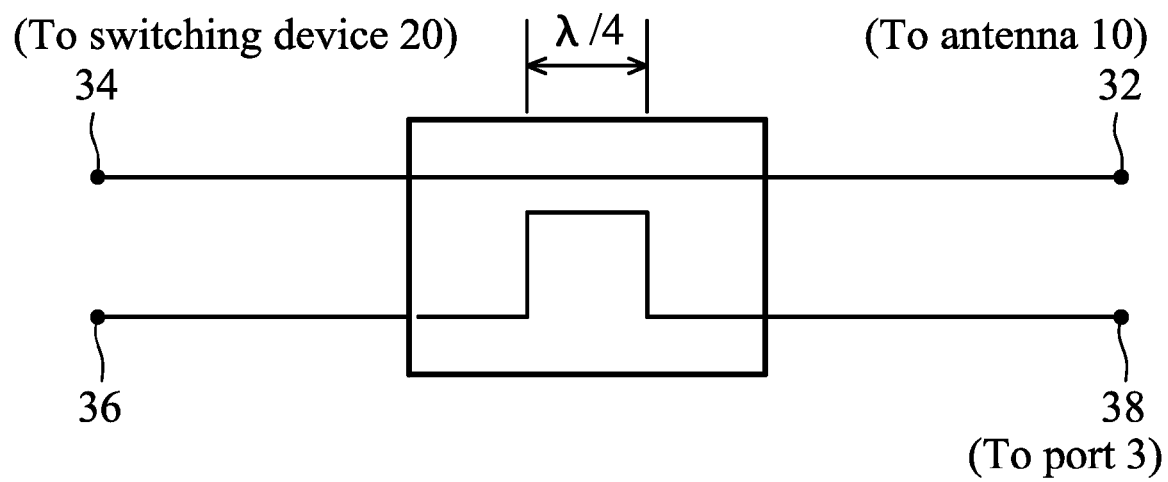
FIG. 6 depicts a diagram of a directional coupler according to an embodiment of the invention.

The directional coupler 30, being a 4-port element, is shown in FIG. 6. In FIG. 6, the directional coupler 30 comprises four ports 32, 34, 36 and 38. The port 34 is connected to the port 32 via a through path. The port 36 is connected to the port 38 via a through path. The ports 34 and 36 are coupled via a coupled path. The ports 32 and 38 are coupled via a coupled path. The ports 36 and 32 are isolated. The ports 34 and 38 are isolated. By using two transmission lines set sufficiently close together, the electrical signals (or energy) directed from the ports 34 to 32 is coupled to the port 36, the electrical signals (or energy) directed from the ports 32 to 34 is coupled to the port 38 (port 3 of the wireless communication chipset 100), and the electrical signals (or energy) directed from the port 38 (port 3 of the wireless communication chipset 100) to the port 36 is coupled to the port 32 (antenna 10). The port 36 is unused and can be connected to an external node for impedance matching. The external node may be a 50Ω resistor. The common coupling values for various directional couplers are listed in the Table 1 below:

TABLE 1

| Coupling Value For Through Path | Power Ratio (%) |
| --- | --- |
| 3 dB | 50/50 |
| 6 dB | 75/25 |
| 8 dB | 85/15 |
| 10 dB | 90/10 |
| 15 dB | 97/3 |
| 20 dB | 99/1 |

Take the coupling value of 3 dB (3 dB directional coupler) as an example, the through path has a path loss of 3 dB substantially, whereas the coupled path has a path loss of 3 dB substantially. For the 6 dB directional coupler, the through path has a path loss of 1 dB substantially, whereas the coupled path has a path loss of 6 dB substantially. For the 10 dB directional coupler, the through path has a path loss of 0.5 dB substantially, whereas the coupled path has a path loss of 10 dB substantially.

In FIG. 4, the combiner 122 is configured to combine the WiFi and Bluetooth Tx signals into a first combined signal when both of the WiFi module 110 and Bluetooth module 112 are performing Tx operations. The first combined signal is sent to the PA unit 130 which amplifies the power of the first combined signal for transmission. The balun-switch unit 136 is configured to selectively connect the terminal 26 (port 2) to the LNA unit 132 or the buffer 144. When a second combined signal, that comprises WiFi and Bluetooth Rx signals to be received by the WiFi module 110 and Bluetooth module 112, is received by the antenna 10, the LNA unit 132 amplifies the second combined signal with little noise to generate an amplified low-noise signal. The amplified low-noise signal is then separated by the separator 124 into the WiFi and Bluetooth Rx signals. The balun-switch unit 138 is configured to selectively connect the port 38 to the buffers 146 or 148.

Table 2 below depicts combinations of potential operation types performed by the system 400 according to an embodiment of the invention:

TABLE 2

| | Operation Type | | | |
| --- | --- | --- | --- | --- |
| Mode | WiFi_Tx | WiFi_Rx | BT_Tx | BT_Rx |
| Mode 1 | 0 | 0 | 0 | 0 |
| Mode 2 | 0 | 0 | 0 | 1 (Port 2) |
| Mode 3 | 0 | 0 | 1 (Port 2) | 0 |
| Mode 4 | 0 | 0 | 1 | 1 |
| Mode 5 | 0 | 1 (Port 2) | 0 | 0 |
| Mode 6 | 0 | 1 (Port 2) | 0 | 1 (Port 2) |
| Mode 7 | 0 | 1 (Port 2) | 1 (Port 3) | 0 |
| Mode 8 | 0 | 1 | 1 | 1 |
| Mode 9 | 1 (Port 1) | 0 | 0 | 0 |
| Mode 10 | 1 (Port 1) | 0 | 0 | 1 (Port 3) |
| Mode 11 | 1 (Port 1) | 0 | 1 (Port 1) | 0 |
| Mode 12 | 1 | 0 | 1 | 1 |
| Mode 13 | 1 | 1 | 0 | 0 |
| Mode 14 | 1 | 1 | 0 | 1 |
| Mode 15 | 1 | 1 | 1 | 0 |
| Mode 16 | 1 | 1 | 1 | 1 |

In Table 2 above, "1" means TRUE, representing the existence of a corresponding operation, whereas "0" means FALSE, representing the absence of a corresponding operation. The mode 1, where no operation exists, is meaningless and not described. The mode 12, where the Bluetooth module 112 performs Tx and Rx operations simultaneously, is not allowed. Thus, the mode 12 is not described. The modes 13 to 16, where the WiFi module 110 performs Tx and Rx operations simultaneously, are also not allowed. Thus, the modes 13 to 16 are not described. The operation modes in Table 2 above will be described with reference to the flowchart of FIG. 7.

Figure 7A:
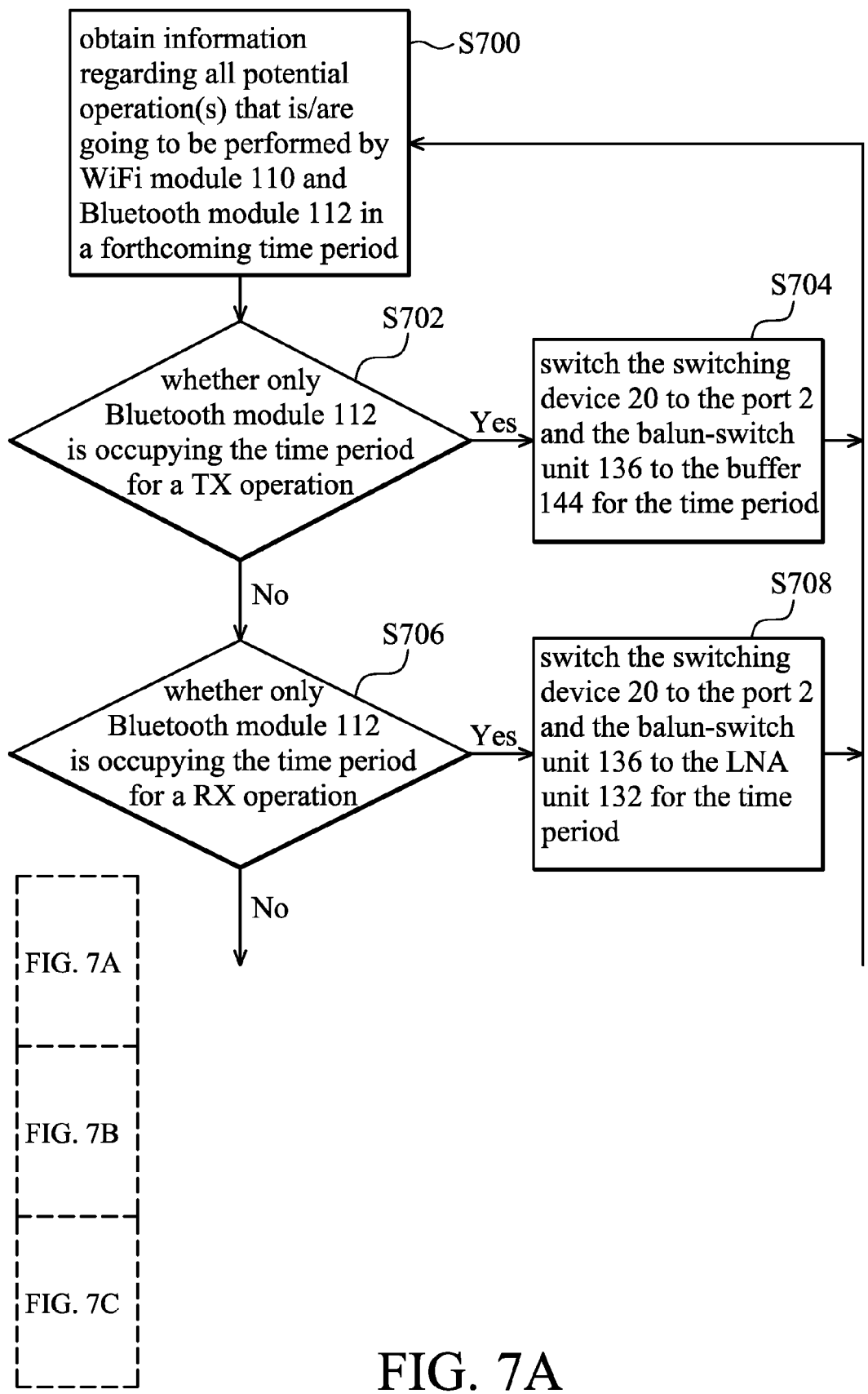
FIG. 7 depicts a flowchart for operating coexistence between WiFi and Bluetooth modules according to an embodiment of the invention, which is performed based on the system of FIG. 4.
Figure 7B:
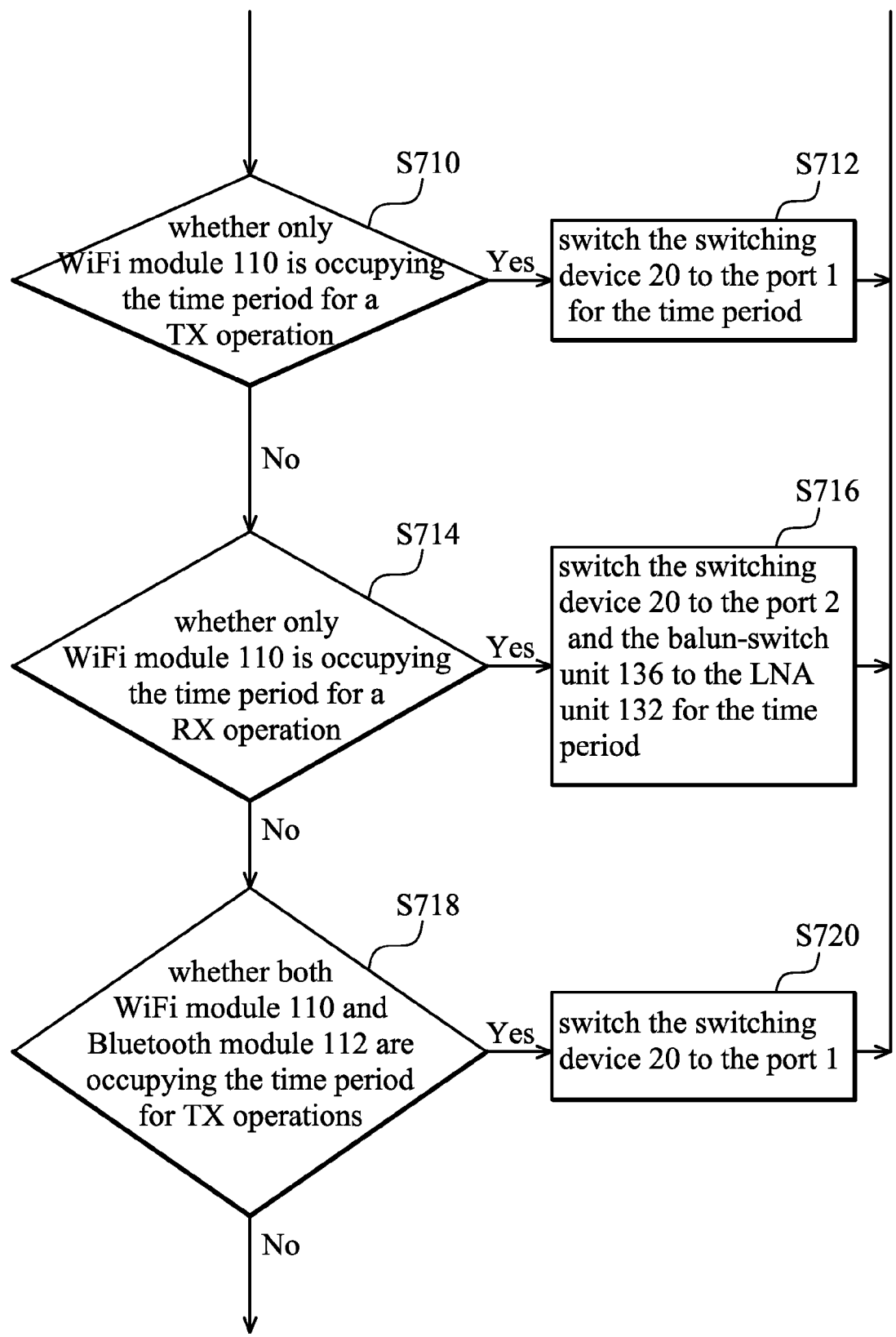
Figure 7C:
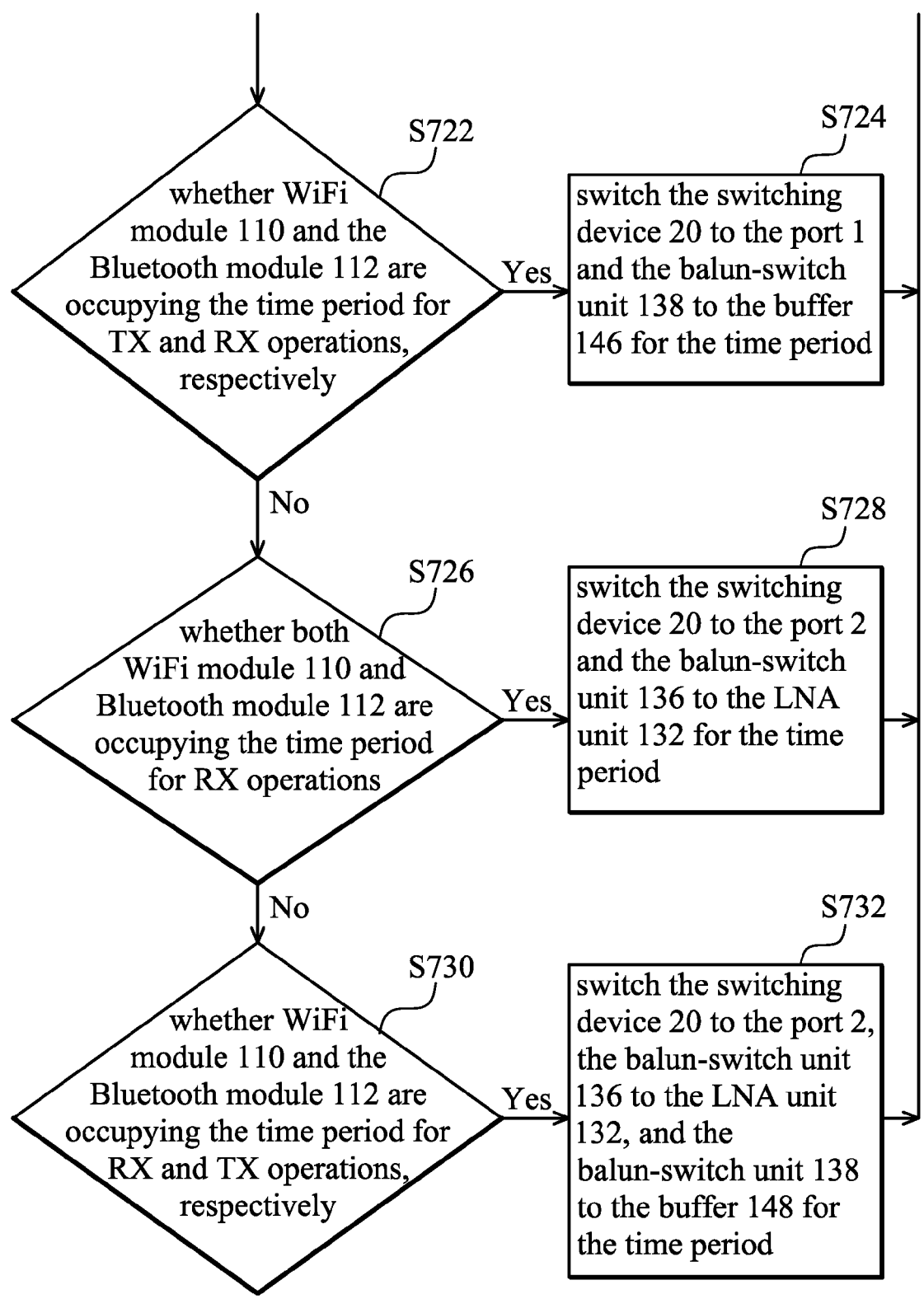

FIG. 7 depicts a flowchart for operating coexistence between WiFi and Bluetooth modules according to an embodiment of the invention. The procedure begins with obtaining information regarding potential operation(s) that is/are going to be performed by the WiFi module 110 and Bluetooth module 112 in a forthcoming time period. Subsequently, a series of inspections with respect to the obtained information are accordingly performed to determine whether only one or both of the WiFi module 110 and Bluetooth module 112 is/are occupying the time period, and determine whether the time period is occupied by the WiFi module 110 or Bluetooth module 112 for a Tx and/or an Rx operation. In FIG. 7, the information regarding potential operation(s) that is/are going to be performed by the WiFi module 110 and Bluetooth module 112 in a forthcoming time period is obtained (step S700). Next, it is determined whether only the Bluetooth module 112 is occupying the time period for a Tx operation (step S702). If so, the switching device 20 is switched to the port 2 and the balun-switch unit 136 is switched to the buffer 144 for the time period (mode 3) (step S704), thereby enabling the Bluetooth Tx signals to be transmitted from the Bluetooth module 112 via the buffer 144, the balun-switch unit 136, the port 2 and the through path between the ports 34 and 32 in sequence to the antenna 10. In step S702, if not, it is determined whether only the Bluetooth module 112 is occupying the time period for an Rx operation (step S706). If so, the switching device 20 is switched to the port 2 and the balun-switch unit 136 is switched to the LNA unit 132 for the time period (mode 2) (step S708), thereby enabling the Bluetooth Rx signals to be received from the antenna 10 via the through path between the ports 32 and 34, the port 2, the balun-switch unit 136, the LNA unit 132, the separator 124 and the buffer 142 in sequence and be transmitted to the Bluetooth module 112. In step S706, if not, it is determined whether only the WiFi module 110 is occupying the time period for a Tx operation (step S710). If so, the switching device 20 is switched to the port 1 for the time period (mode 9) (step S712), thereby enabling the WiFi Tx signals to be transmitted from the WiFi module 110 via the combiner 122, the PA unit 130, the balun unit 134, the port 1 and the through path between the ports 34 and 32 in sequence and be transmitted to the antenna 10. In step S710, if not, it is determined whether only the WiFi module 110 is occupying the time period for an Rx operation (step S714). If so, the switching device 20 is switched to the port 2 and the balun-switch unit 136 is switched to the LNA unit 132 for the time period (mode 5) (step S716), thereby enabling the WiFi Rx signals to be received from the antenna 10 via the through path between the ports 32 and 34, the port 2, the balun-switch unit 136, the LNA unit 132, the separator 124 and the buffer 140 in sequence and be transmitted to the WiFi module 110. In step S714, if not, it is determined whether both the WiFi module 110 and the Bluetooth module 112 are occupying the time period for Tx operations (step S718). If so, the switching device 20 is switched to the port 1 for the time period (mode 11) (step S720), thereby enabling a first combined signal, that is generated by the combiner 122 combining the WiFi and Bluetooth Tx signals, to be transmitted from the combiner 122 via the PA unit 130, the balun unit 134, the port 1 and the through path between the ports 34 and 32 in sequence and be transmitted to the antenna 10. In step S718, if not, it is determined whether the WiFi module 110 and the Bluetooth module 112 are occupying the time period for Tx and Rx operations, respectively (step S722). If so, the switching device 20 is switched to the port 1 and the balun-switch unit 138 is switched to the buffer 146 for the time period (mode 10) (step S724), thereby enabling the WiFi Tx signals to be transmitted from the WiFi module 110 via the combiner 122, the PA unit 130, the balun unit 134, the port 1 and the through path between the ports 34 and 32 in sequence and be transmitted to the antenna 10, and the Bluetooth Rx signals to be received from the antenna 10 via the coupled path between the ports 32 and 38, the port 3, the balun-switch unit 138 and the buffer 146 in sequence and be transmitted to the Bluetooth module 112. In step S722, if not, it is determined whether both the WiFi module 110 and the Bluetooth module 112 are occupying the time period for Rx operations (step S726). If so, the switching device 20 is switched to the port 2 and the balun-switch unit 136 is switched to the LNA unit 132 for the time period (mode 6) (step S728), thereby enabling the WiFi and Bluetooth Rx signals that are obtained by the separator 124 separating a second combined signal received from the antenna 10 via the through path between ports 32 and 34, the port 2, the balun-switch unit 136 and the LNA unit 132, to be received respectively via the buffers 140 and 142 in sequence and be transmitted to the WiFi module 110 and the Bluetooth module 112. In step S726, if not, it is determined whether the WiFi module 110 and the Bluetooth module 112 are occupying the time period for Rx and Tx operations, respectively (step S730). If so, the switching device 20 is switched to the port 2, the balun-switch unit 136 is switched to the LNA unit 132, and the balun-switch unit 138 is switched to the buffer 148 for the time period (mode 7) (step S732), thereby enabling the WiFi Rx signals to be received from the antenna 10 via the through path between the ports 32 and 34, the port 2, the balun-switch unit 136, the LNA unit 132, the separator 124 and the buffer 140 in sequence and be transmitted to the WiFi module 110, and the Bluetooth Tx signals to be transmitted from the Bluetooth module 112 via the buffer 148, the balun-switch unit 138, the port 3 and the coupled path between the ports 38 and 32 in sequence to the antenna 10.

Those skilled in the art may readily modify the hardware structure of the system 400 by replacing the directional coupler 30 (e.g., the connection device) with a 3-port power splitter having an input port 32 and two output ports 34 and 36. The first path between the input port 32 and the output port 34 has a first path loss, and the second path between the input port 32 and the output port 36 has a second path loss. For a power splitter with equal loss, the path loss of the first and second paths is the same, while it is different for an unequal-loss power splitter. Reference may be made to Table 1 concerning the coupling values for the power splitter, so they will not be described herein for brevity.

Figure 8:
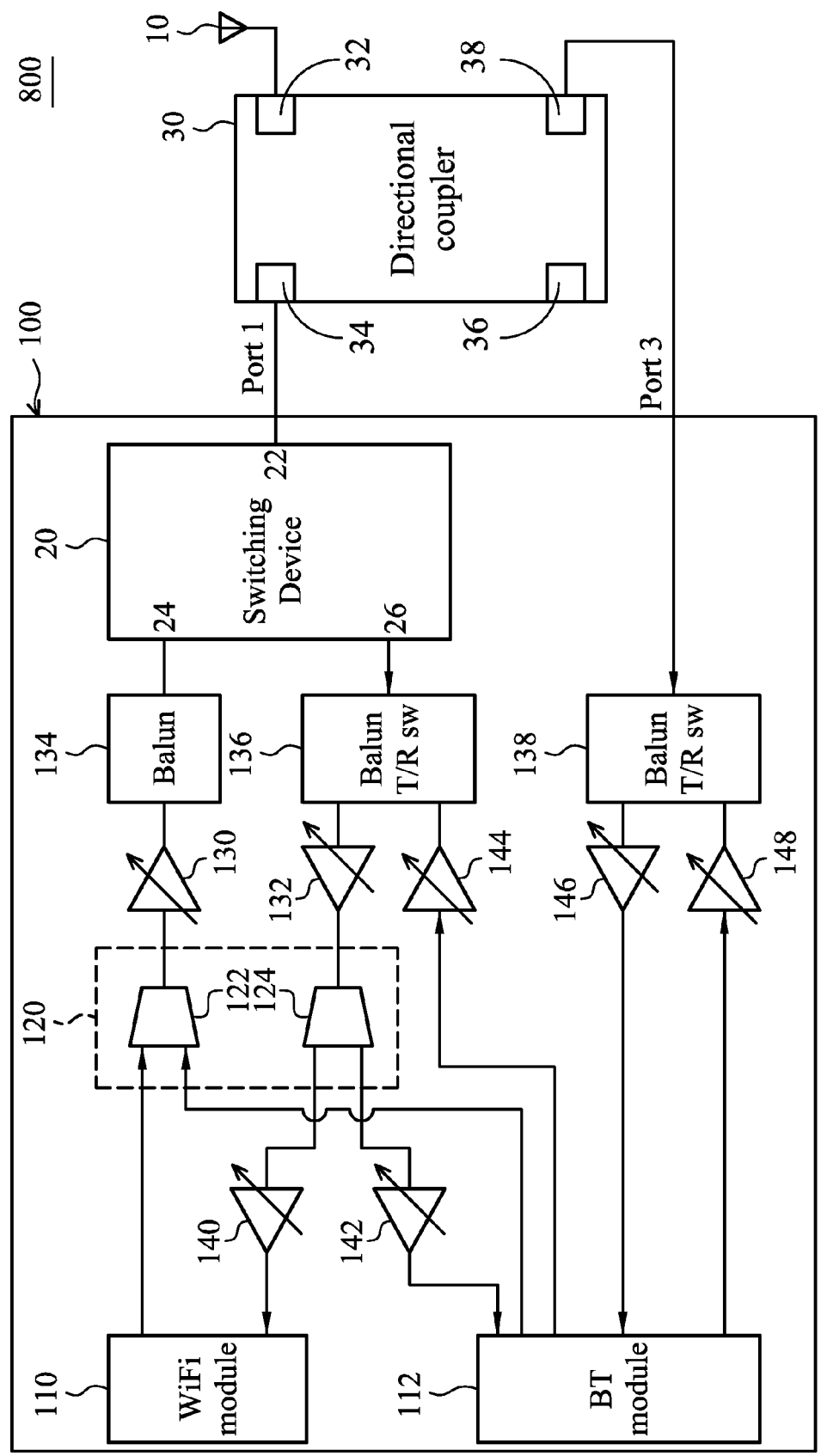
FIG. 8 depicts a diagram of a system for the coexistence between a plurality of wireless communication modules sharing an antenna according to another embodiment of the invention.

In another embodiment of the invention, the switching device 20 in the system 400 may be incorporated into a wireless communication chipset 100, as shown in FIG. 8. Table 3 below depicts combinations of potential operation types performed by the system 800:

TABLE 3

| Mode | Operation Type | | | |
| | WiFi_Tx | WiFi_Rx | BT_Tx | BT_Rx |
|---|---|---|---|---|
| Mode 2 | 0 | 0 | 0 | 1 (Port 1) |
| Mode 3 | 0 | 0 | 1 (Port 1) | 0 |
| Mode 5 | 0 | 1 (Port 1) | 0 | 0 |
| Mode 6 | 0 | 1 (Port 1) | 0 | 1 (Port 1) |
| Mode 7 | 0 | 1 (Port 1) | 1 (Port 3) | 0 |
| Mode 9 | 1 (Port 1) | 0 | 0 | 0 |
| Mode 10 | 1 (Port 1) | 0 | 0 | 1 (Port 3) |
| Mode 11 | 1 (Port 1) | 0 | 1 (Port 1) | 0 |

Figure 9A:
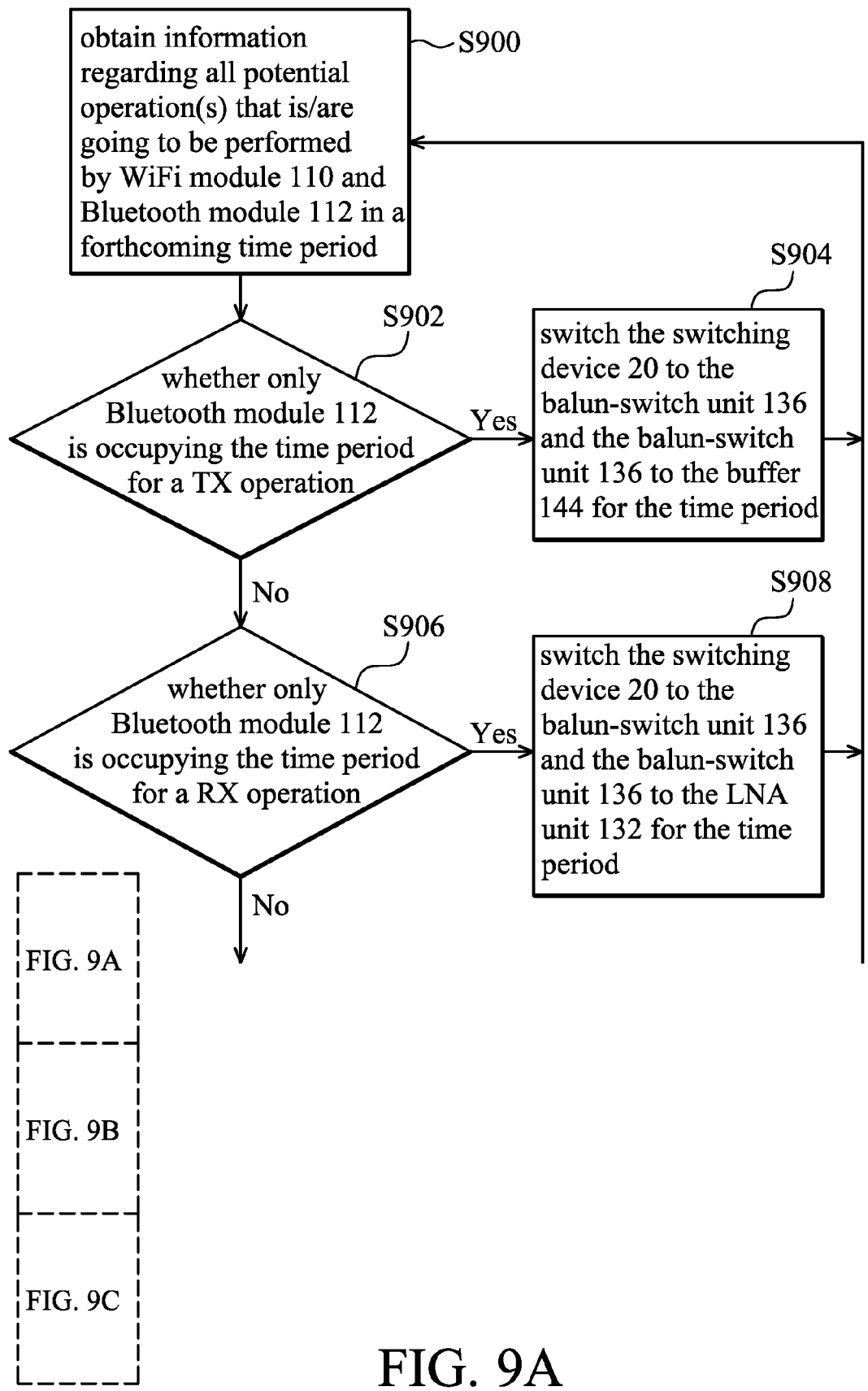
FIG. 9 depicts a flowchart for operating coexistence between WiFi and Bluetooth modules according to an embodiment of the invention, which is performed based on the system of FIG. 8.
Figure 9B:
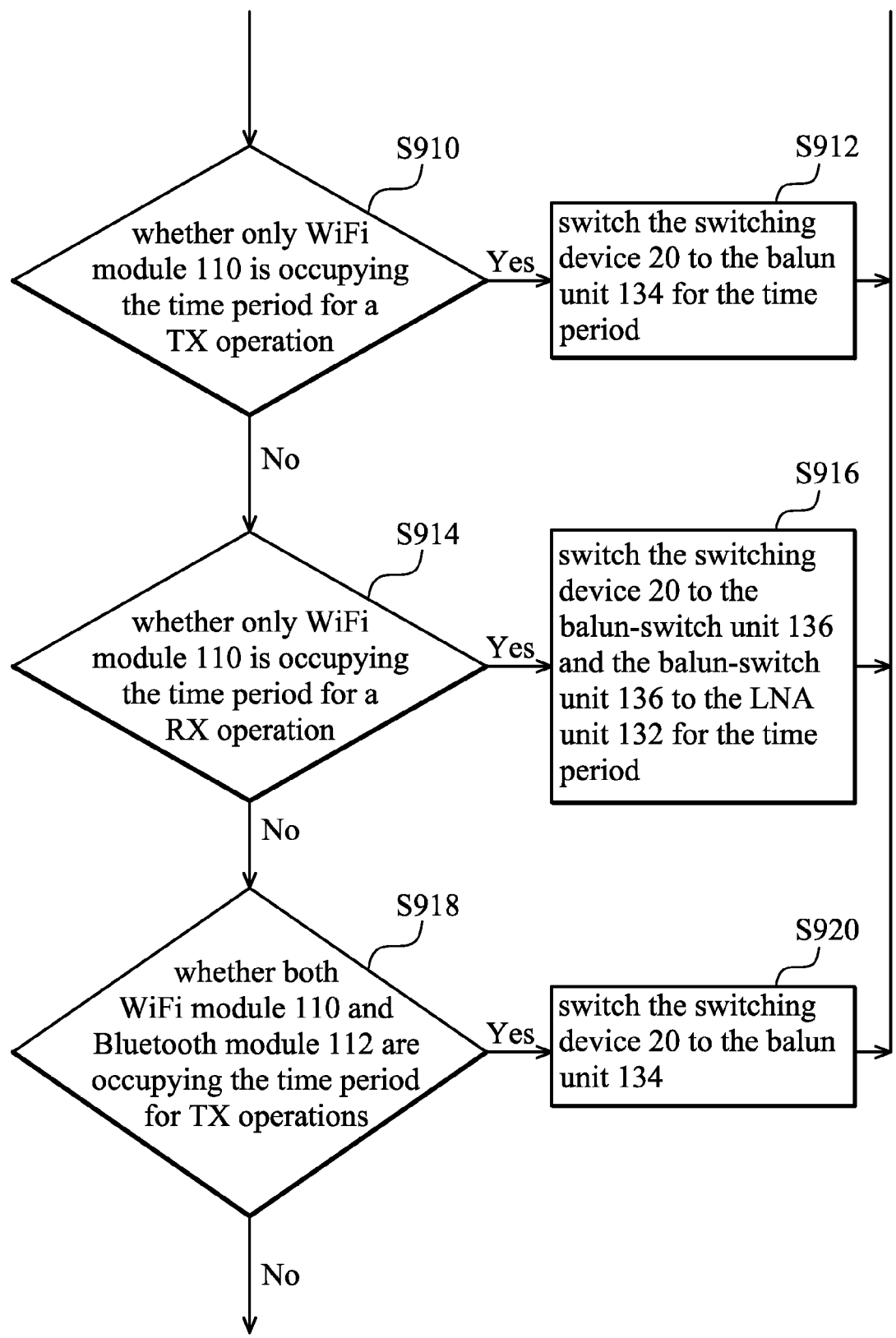
Figure 9C:
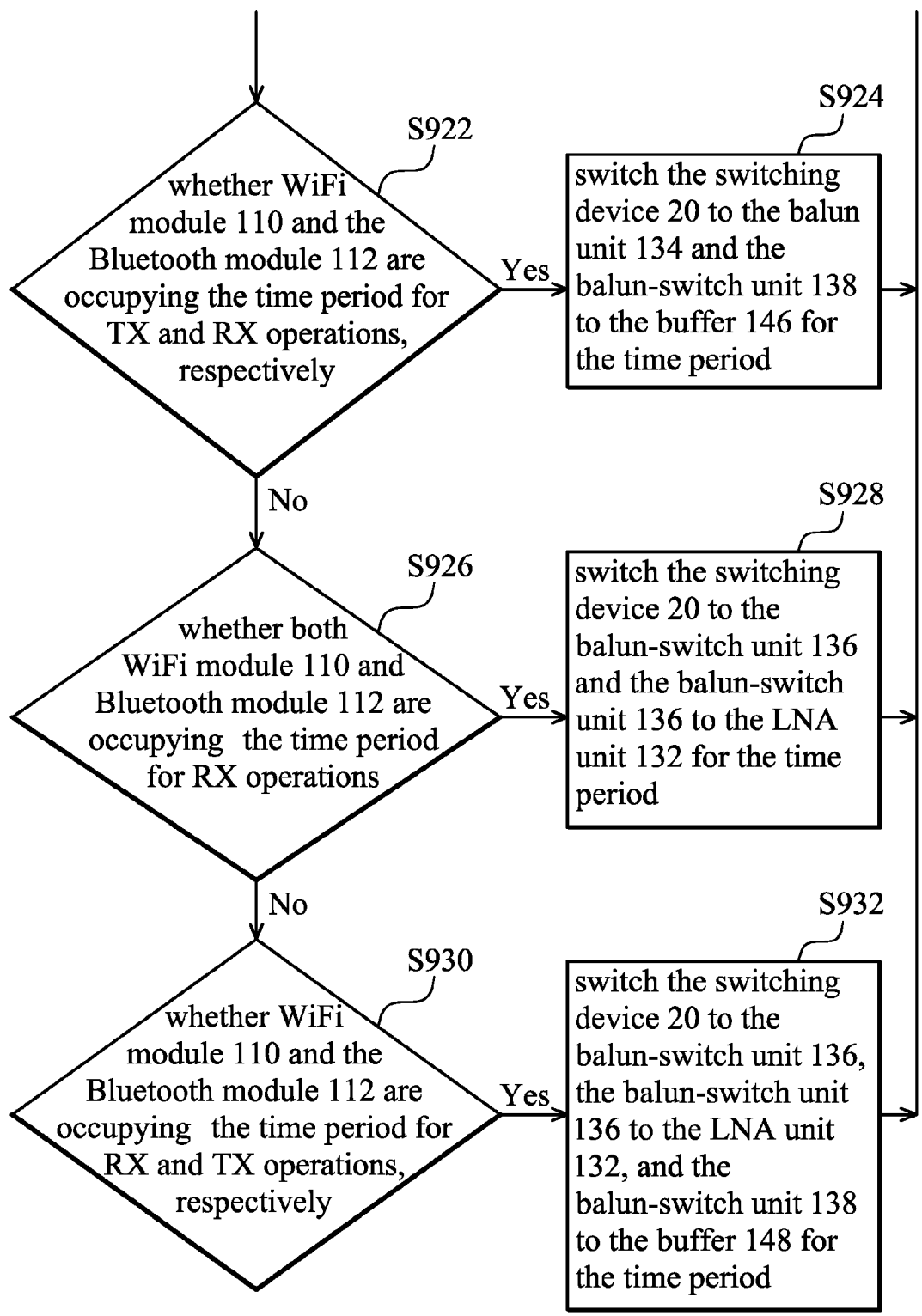

The procedure begins with obtaining information regarding potential operation(s) that is/are going to be performed by the WiFi module 110 and Bluetooth module 112 in a forthcoming time period. Subsequently, a series of inspections with respect to the obtained information are accordingly performed to determine whether only one or both of the WiFi module 110 and Bluetooth module 112 is/are occupying the time period, and determine whether the time period is occupied by the WiFi module 110 and/or Bluetooth module 112 for a Tx and/or an Rx operation. In FIG. 9, the information regarding potential operation(s) that is/are going to be performed by the WiFi module 110 and Bluetooth module 112 in a forthcoming time period is obtained (step S900). Next, it is determined whether only the Bluetooth module 112 is occupying the time period for a Tx operation (step S902). If so, the switching device 20 is switched to the balun-switch unit 136 and the balun-switch unit 136 is switched to the buffer 144 for the time period (mode 3) (step S904), thereby enabling the Bluetooth Tx signals to be transmitted from the Bluetooth module 112 via the buffer 144, the balun-switch unit 136, the port 1 and the through path between the ports 34 and 32 in sequence to the antenna 10. In step S902, if not, it is determined whether only the Bluetooth module 112 is occupying the time period for an Rx operation (step S906). If so, the switching device 20 is switched to the balun-switch unit 136 and the balun-switch unit 136 is switched to the LNA unit 132 for the time period (mode 2) (step S908), thereby enabling the Bluetooth Rx signals to be received from the antenna 10 via the through path between the ports 32 and 34, the port 1, the balun-switch unit 136, the LNA unit 132, the separator 124 and the buffer 142 in sequence and be transmitted to the Bluetooth module 112. In step S906, if not, it is determined whether only the WiFi module 110 is occupying the time period for a Tx operation (step S910). If so, the switching device 20 is switched to the balun unit 134 for the time period (mode 9) (step S912), thereby enabling the WiFi Tx signals to be transmitted from the WiFi module 110 via the combiner 122, the PA unit 130, the balun unit 134, the port 1 and the through path between the ports 34 and 32 in sequence to the antenna 10. In step S910, if not, it is determined whether only the WiFi module 110 is occupying the time period for an Rx operation (step S914). If so, the switching device 20 is switched to the balun-switch unit 136 and the balun-switch unit 136 is switched to the LNA unit 132 for the time period (mode 5) (step S916), thereby enabling the WiFi Rx signals to be received from the antenna 10 via the through path between the ports 32 and 34, the port 1, the balun-switch unit 136, the LNA unit 132, the separator 124 and the buffer 140 in sequence and be transmitted to the WiFi module 110. In step S914, if not, it is determined whether both the WiFi module 110 and the Bluetooth module 112 are occupying the time period for Tx operations (step S918). If so, the switching device 20 is switched to the balun unit 134 for the time period (mode 11) (step S920), thereby enabling a first combined signal, that is generated by the combiner 122 combining the WiFi and Bluetooth Tx signals, to be transmitted from the combiner 122 via the PA unit 130, the balun unit 134, the port 1 and the through path between the ports 34 and 32 in sequence to the antenna 10. In step S918, if not, it is determined whether the WiFi module 110 and the Bluetooth module 112 are occupying the time period for Tx and Rx operations, respectively (step S922). If so, the switching device 20 is switched to the balun unit 134 and the balun-switch unit 138 is switched to the buffer 146 for the time period (mode 10) (step S924), thereby enabling the WiFi Tx signals to be transmitted from the WiFi module 110 via the combiner 122, the PA unit 130, the balun unit 134, the port 1 and the through path between the ports 34 and 32 in sequence to the antenna 10, and the Bluetooth Rx signals to be received from the antenna 10 via the coupled path between the ports 32 and 38, the port 3, the balun-switch unit 138, the buffer 146 in sequence and be transmitted to the Bluetooth module 112. In step S922, if not, it is determined whether both the WiFi module 110 and the Bluetooth module 112 are occupying the time period for Rx operations (step S926). If so, the switching device 20 is switched to the balun-switch unit 136 and the balun-switch unit 136 is switched to the LNA unit 132 for the time period (mode 6) (step S928), thereby enabling the WiFi and Bluetooth Rx signals that are obtained by the separator 124 separating a second combined signal received from the antenna 10 via the through path between ports 32 and 34, the port 1, the balun-switch unit 136 and the LNA unit 132, to be received respectively via the buffers 140 and 142 in sequence and be transmitted to the WiFi module 110 and the Bluetooth 112. In step S926, if not, it is determined whether the WiFi module 110 and the Bluetooth module 112 are occupying the time period for Rx and Tx operations, respectively (step S930). If so, the switching device 20 is switched to the balun-switch unit 136, the balun-switch unit 136 is switched to the LNA unit 132, and the balun-switch unit 138 is switched to the buffer 148 for the time period (mode 7) (step S932), thereby enabling the WiFi Rx signals to be received from the antenna 10 via the through path between the ports 32 and 34, the port 1, the balun-switch unit 136, the LNA unit 132, the separator 124 and the buffer 140 in sequence and be transmitted to the WiFi module 110, and the Bluetooth Tx signals to be transmitted from the Bluetooth module 112 via the buffer 148, the balun-switch unit 138, the port 3 and the coupled path between the ports 38 and 32 in sequence to the antenna 10.

Figure 10:
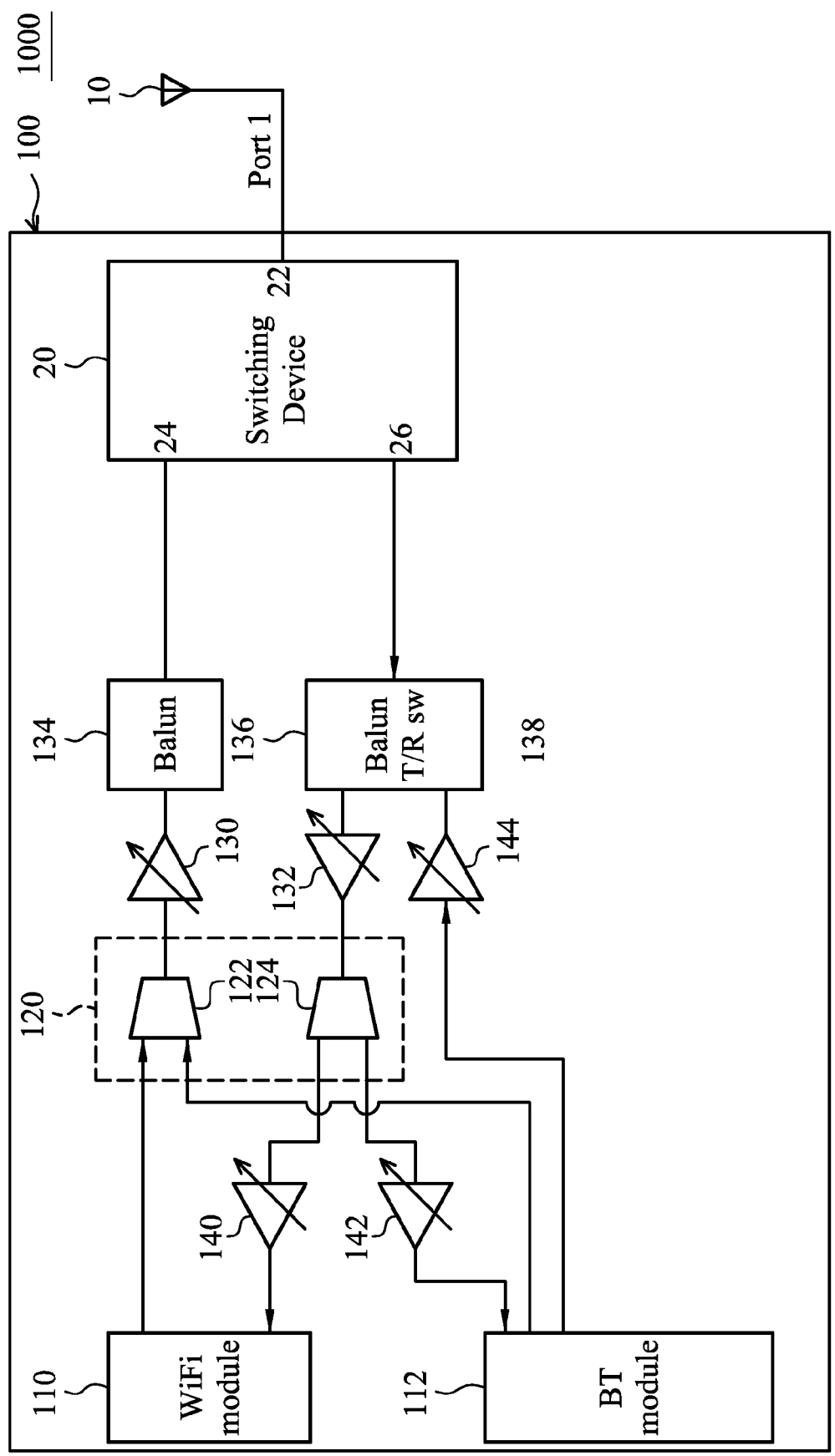
FIG. 10 depicts a diagram of a system for the coexistence between a plurality of wireless communication modules sharing an antenna according to another embodiment of the invention.

FIG. 10 depicts a diagram of a system for the coexistence between a plurality of wireless communication modules sharing an antenna according to an embodiment of the invention, which is modified according to the system 800 of FIG. 8. The operation Table for the system 1000 is similar to the operation Table 3 of the system 800 except for the modes 7 and 10, as shown in Table 4 below:

TABLE 4

| Mode | Operation Type | | | |
| --- | --- | --- | --- | --- |
| | WiFi_Tx | WiFi_Rx | BT_Tx | BT_Rx |
| Mode 2 | 0 | 0 | 0 | 1 (Port 1) |
| Mode 3 | 0 | 0 | 1 (Port 1) | 0 |
| Mode 5 | 0 | 1 (Port 1) | 0 | 0 |
| Mode 6 | 0 | 1 (Port 1) | 0 | 1 (Port 1) |
| Mode 9 | 1 (Port 1) | 0 | 0 | 0 |
| Mode 11 | 1 (Port 1) | 0 | 1 (Port 1) | 0 |

Figure 11A:
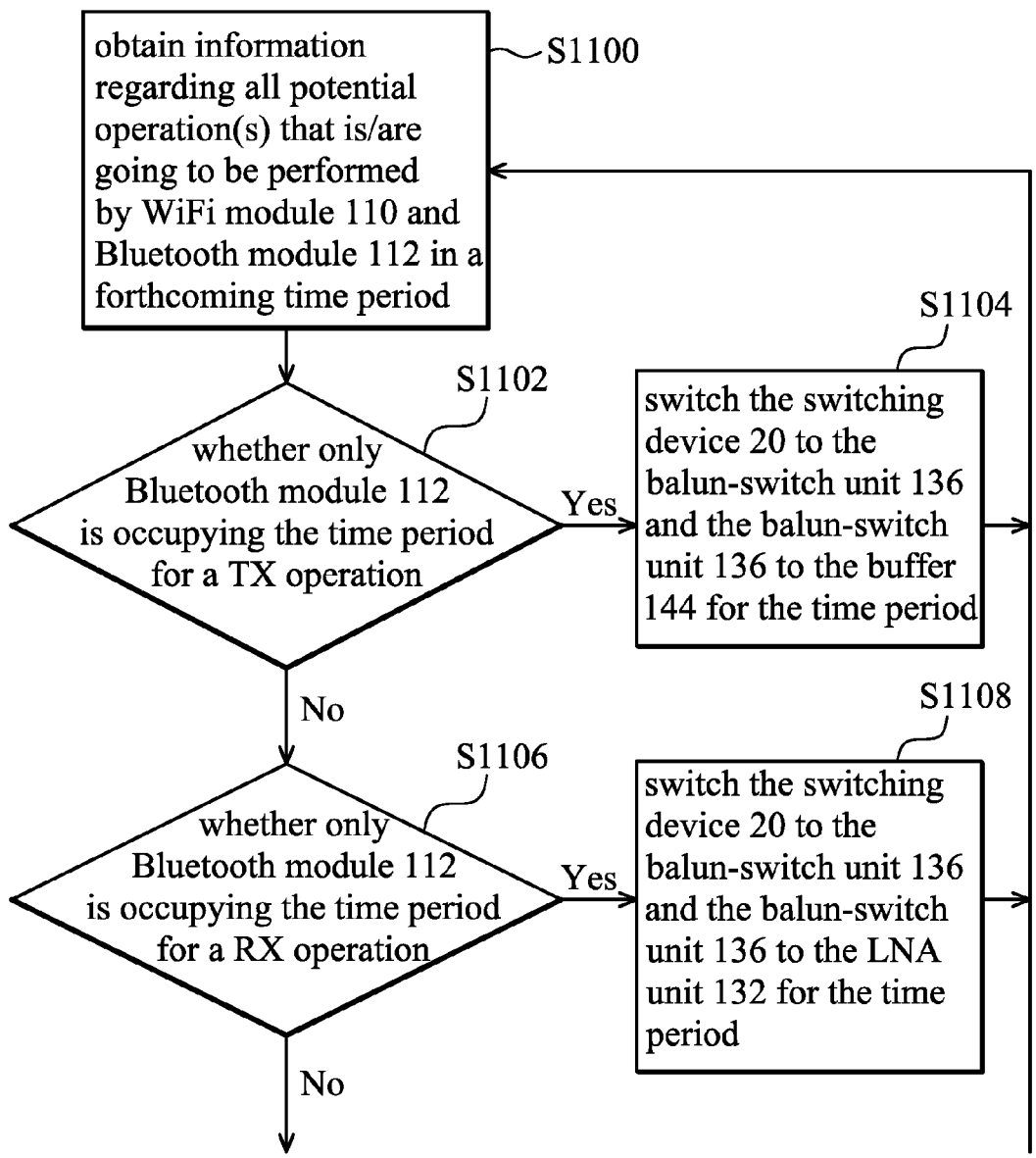
FIG. 11 depicts a flowchart for operating coexistence between WiFi and Bluetooth modules according to an embodiment of the invention, which is performed based on the system of FIG. 10.
Figure 11B:
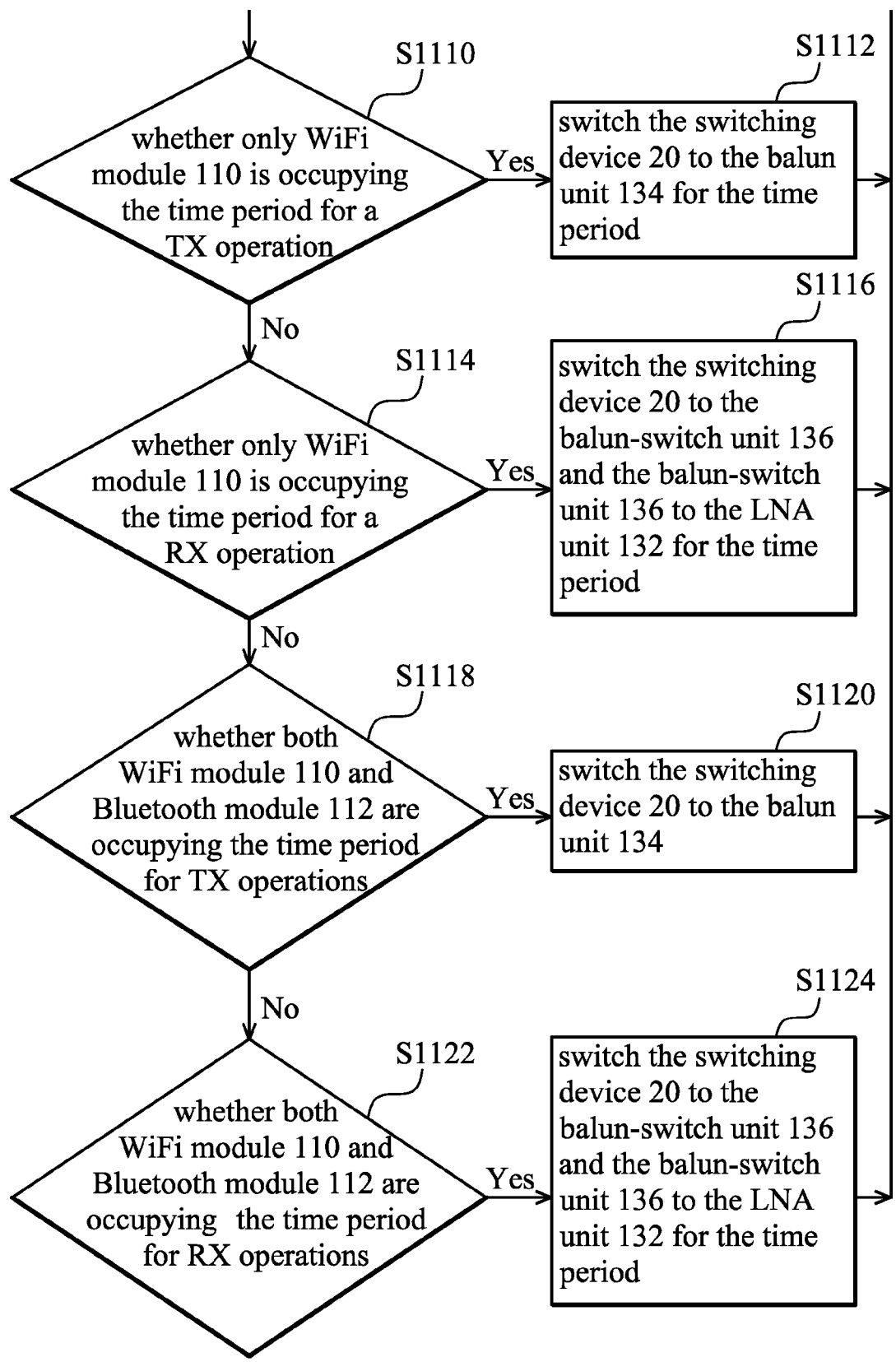

There are no modes 7 and 10 in Table 4 as compared to Table 3 as the system 1000 has no directional coupler 30. The flowchart for operating the system 1000 is similar to the flowchart for operating the system 800 as shown in FIG. 9, with the exception that steps S922, S924, S930 and S932 are eliminated, as simplified and shown in FIG. 11. Since the method steps of FIG. 11 have already been described previously with reference to FIG. 9, it is not described herein for brevity.

Figure 12:
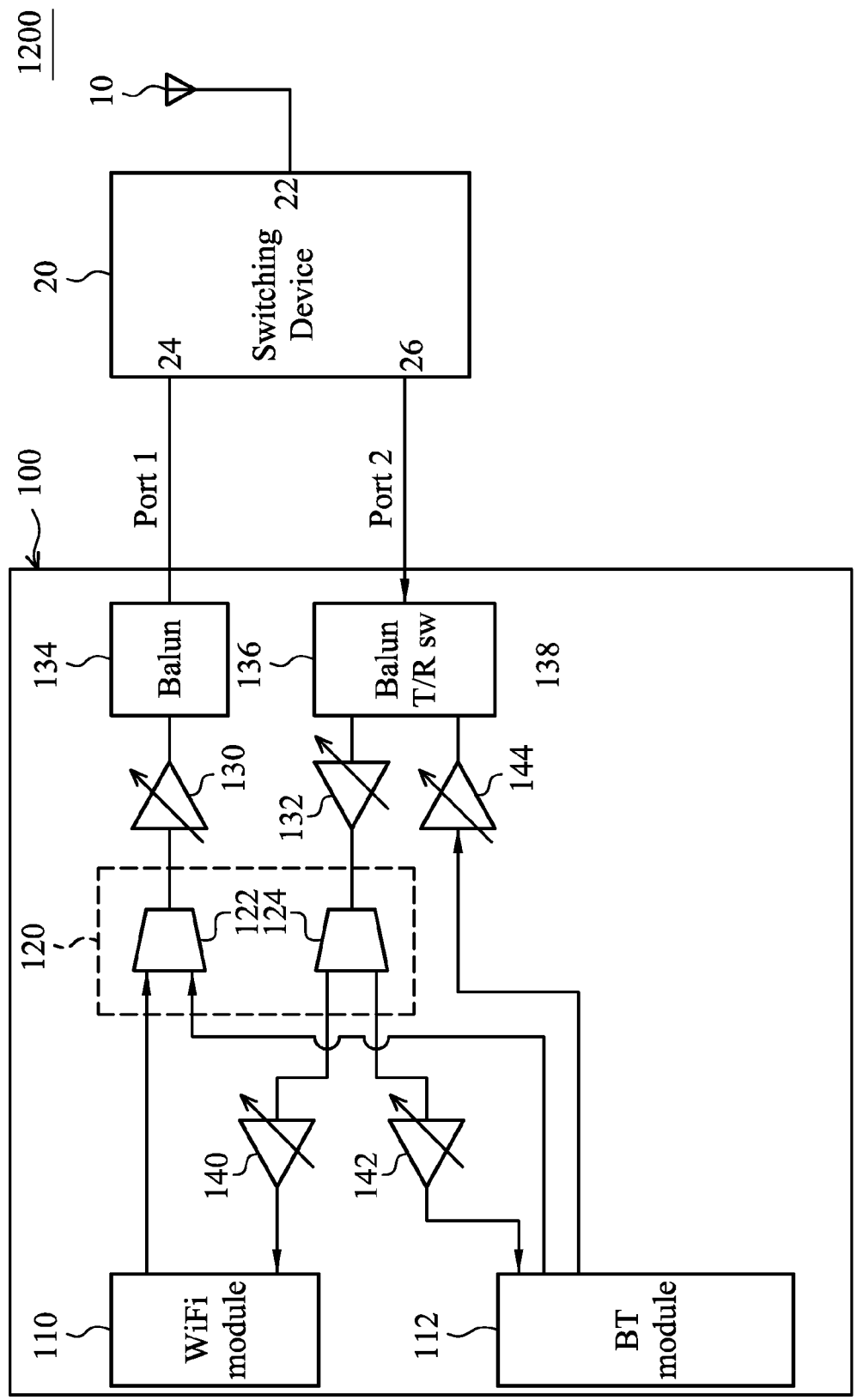
FIG. 12 depicts a diagram of a system for the coexistence between a plurality of wireless communication modules sharing an antenna according to another embodiment of the invention.

FIG. 12 depicts a diagram of a system for the coexistence between a plurality of wireless communication modules sharing an antenna according to an embodiment of the invention, which is modified according to the system 400 of FIG. 4. Table 5 below depicts the operation modes for the system 1200.

TABLE 5

| Mode | Operation Type | | | |
| --- | --- | --- | --- | --- |
| | WiFi_Tx | WiFi_Rx | BT_Tx | BT_Rx |
| Mode 2 | 0 | 0 | 0 | 1 (Port 2) |
| Mode 3 | 0 | 0 | 1 (Port 2) | 0 |
| Mode 5 | 0 | 1 (Port 2) | 0 | 0 |

TABLE 5-continued

| | Operation Type | | | |
|---|---|---|---|---|
| Mode | WiFi_Tx | WiFi_Rx | BT_Tx | BT_Rx |
| Mode 6 | 0 | 1 (Port 2) | 0 | 1 (Port 2) |
| Mode 9 | 1 (Port 1) | 0 | 0 | 0 |
| Mode 11 | 1 (Port 1) | 0 | 1 (Port 1) | 0 |

Figure 13A:
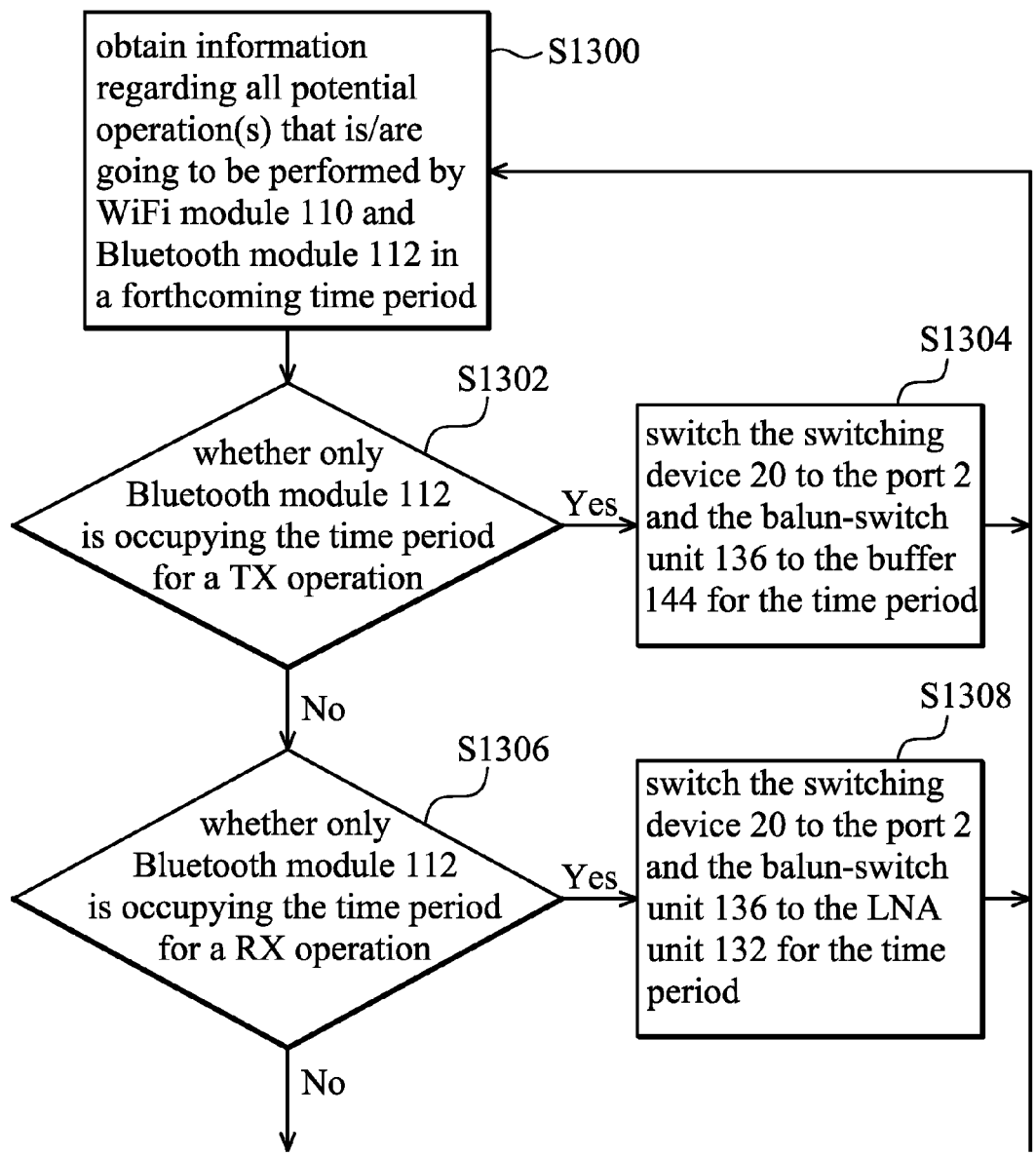
FIG. 13 depicts a flowchart for operating coexistence between WiFi and Bluetooth modules according to an embodiment of the invention, which is performed based on the system of FIG. 8.
Figure 13A:
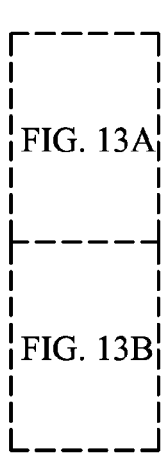
Figure 13B:
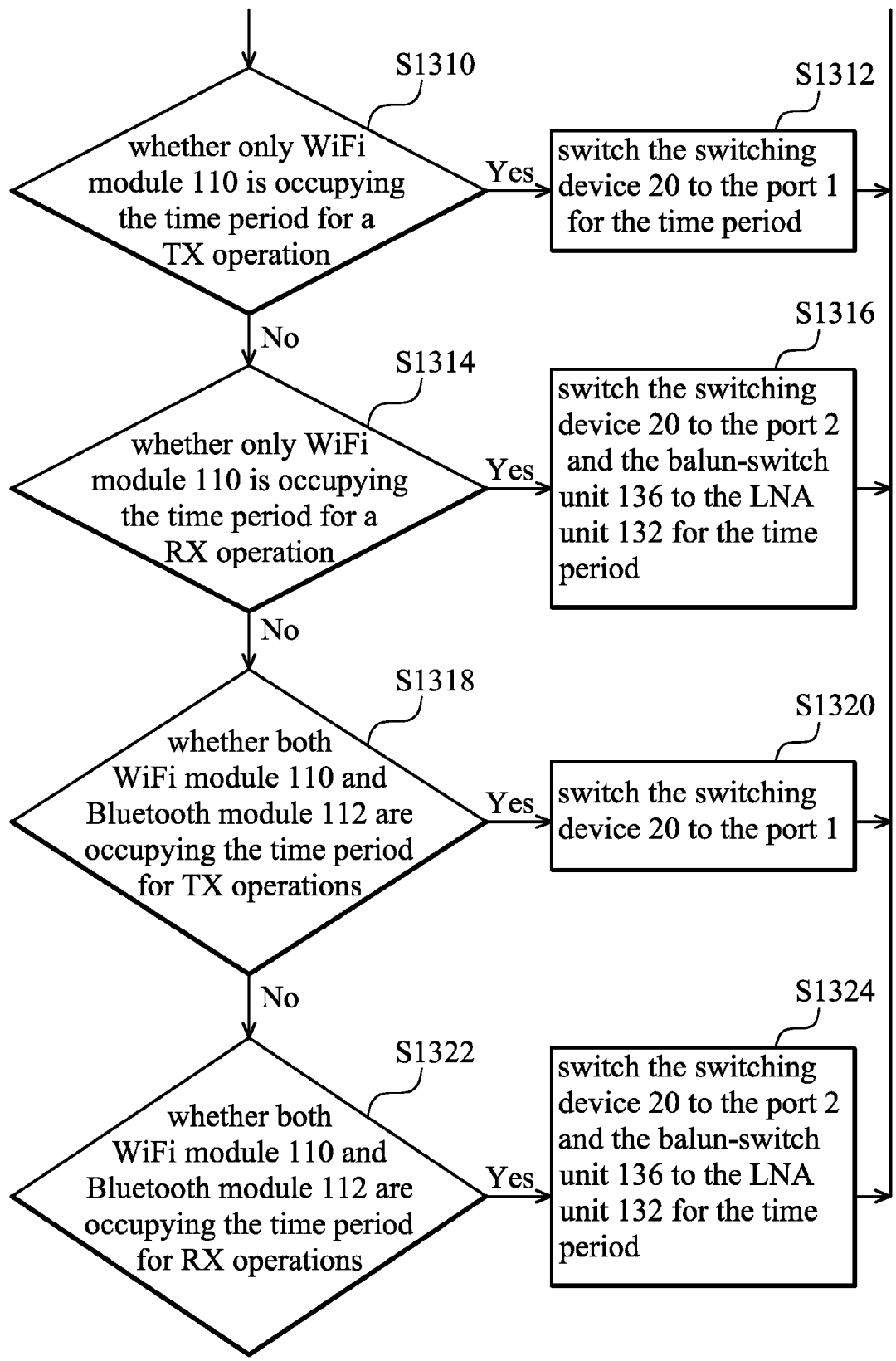

The flowchart for operating the system 1200 is similar to the flowchart for operating the system 400 as shown in FIG. 7, with the exception that steps S722, S724, S730 and S732 are eliminated, as simplified and shown in FIG. 13. Since the method steps of FIG. 13 have already been described previously with reference to FIG. 7, it is not described herein for brevity.

Figure 14:
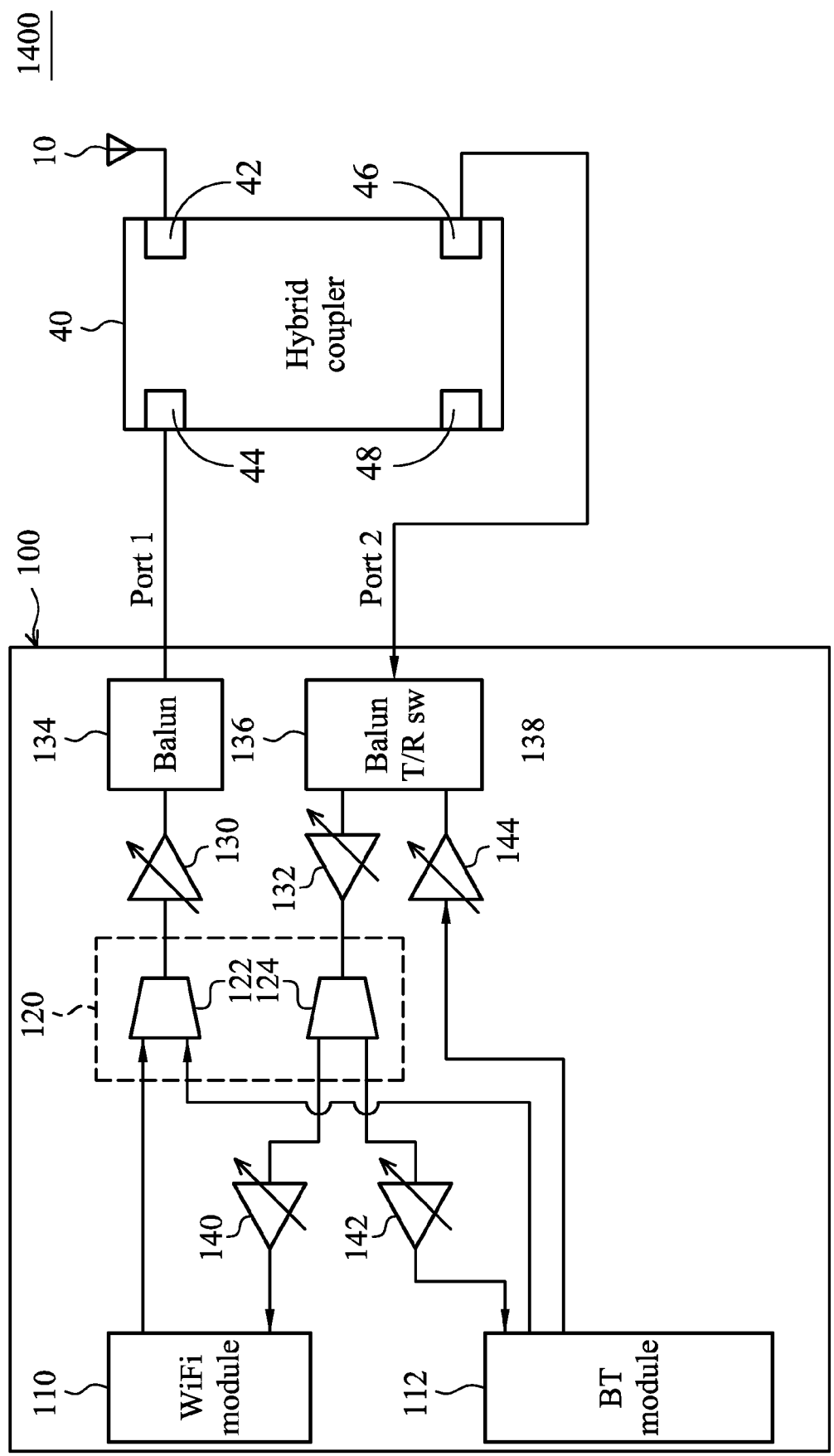
FIG. 14 depicts a diagram of a system for the coexistence between a plurality of wireless communication modules sharing an antenna according to another embodiment of the invention.
Figure 15:
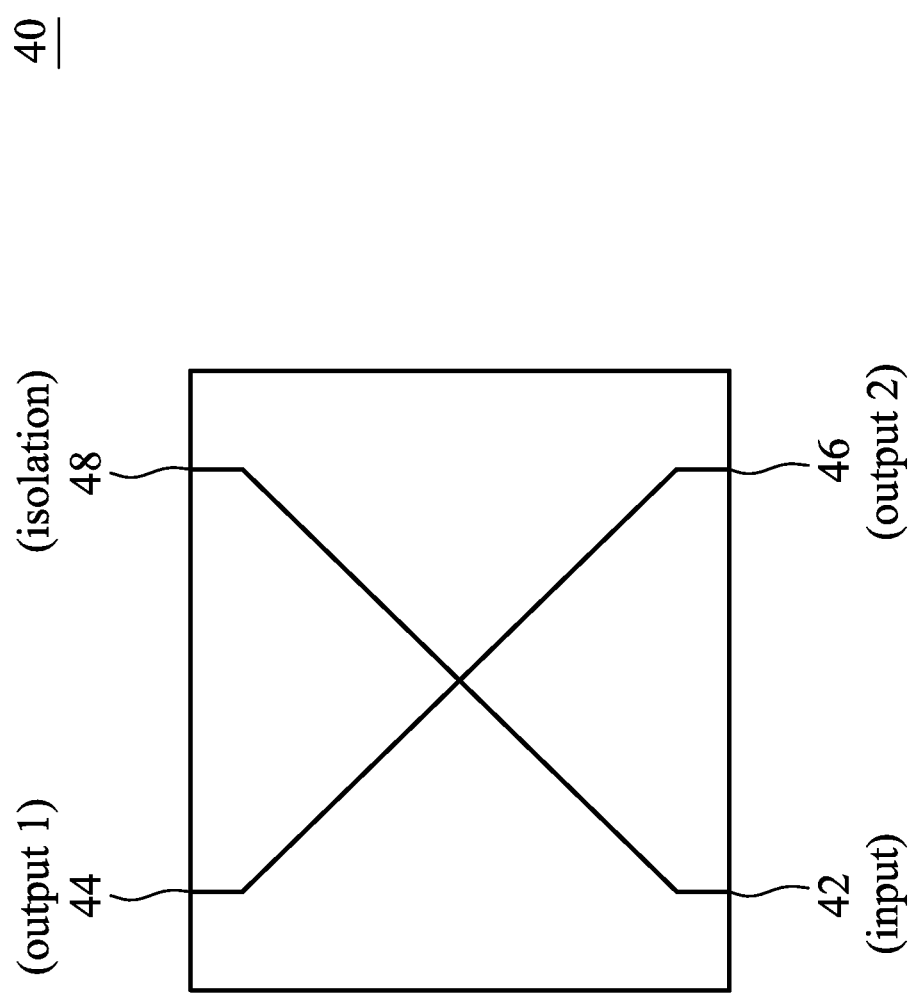
FIG. 15 depicts a diagram of a hybrid coupler according to an embodiment of the invention.

FIG. 14 depicts a diagram of a system for the coexistence between a plurality of wireless communication modules sharing an antenna according to an embodiment of the invention. The system 1400 comprises, a wireless communication chipset 100 and a hybrid coupler 40 (e.g., the connection device used in this embodiment). It should be noted that the hybrid coupler 40 can be also referred to as a balanced-loss coupler in some situations by person skilled in the art. FIG. 15 depicts a diagram of the hybrid coupler 40. In FIG. 15, the hybrid coupler 40 comprises ports 42, 44, 46 and 48 and is used either to equally split an input signal with a resultant 90° phase shift among the output ports or to combine two signals while maintaining high isolation between the output ports. The ports 42 and 44 are connected via a through path. The ports 46 and 48 are connected via a through path. The ports 42 and 46 are coupled via a coupled path. The ports 44 and 48 are coupled via a coupled path. The ports 42 and 48 are isolated. The ports 44 and 46 are isolated. As an example, when port 42 is an input port, half of the power introduced at the port 42 will be delivered to the output port 44, and the other half of the power will be coupled to the another output port 46 with a 90° phase shift. Thus, it makes no difference which port serves as the input port.

The hybrid coupler 40 may also be replaced by a 3-port power divider with an input port and two output ports, as the power divider may also equally split an input signal. Additionally, the hybrid coupler 40 in the embodiment may also be replaced by the directional coupler 30 (unequal loss) described above.

Table 6 below depicts the combination of operation modes for the system 1400:

TABLE 6

| | Operation Type | | | |
|---|---|---|---|---|
| Mode | WiFi_Tx | WiFi_Rx | BT_Tx | BT_Rx |
| Mode 2 | 0 | 0 | 0 | 1 (Port 2) |
| Mode 3 | 0 | 0 | 1 (Port 2) | 0 |
| Mode 5 | 0 | 1 (Port 2) | 0 | 0 |
| Mode 6 | 0 | 1 (Port 2) | 0 | 1 (Port 2) |
| Mode 7 | 0 | 1 (Port 2) | 1 (Port 1) | 0 |
| Mode 9 | 1 (Port 1) | 0 | 0 | 0 |
| Mode 10 | 1 (Port 1) | 0 | 0 | 1 (Port 2) |
| Mode 11 | 1 (Port 1) | 0 | 1 (Port 1) | 0 |

Figure 16A:
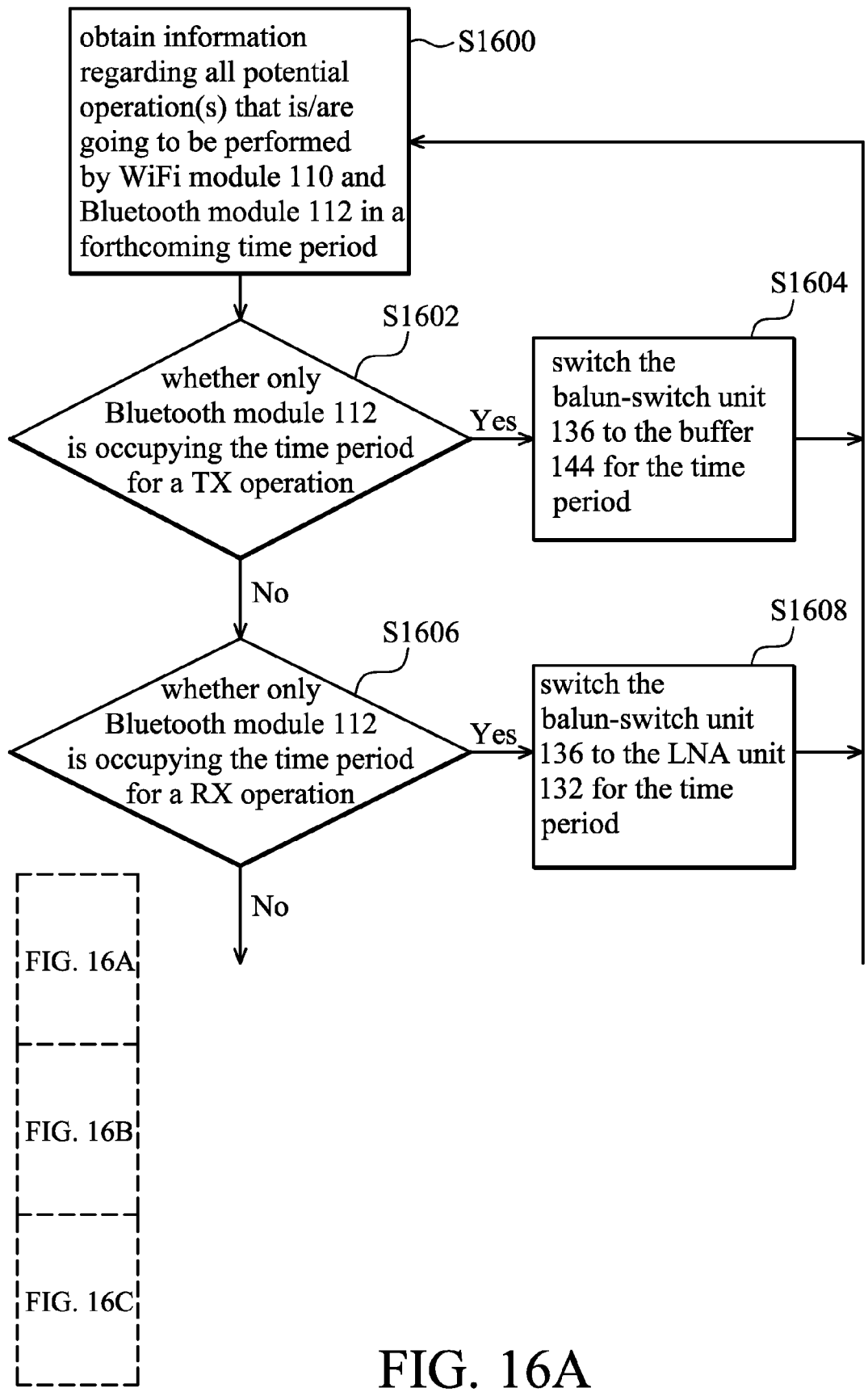
FIG. 16 depicts a flowchart for operating coexistence between WiFi and Bluetooth modules according to an embodiment of the invention, which is performed based on the system of FIG. 14.
Figure 16B:
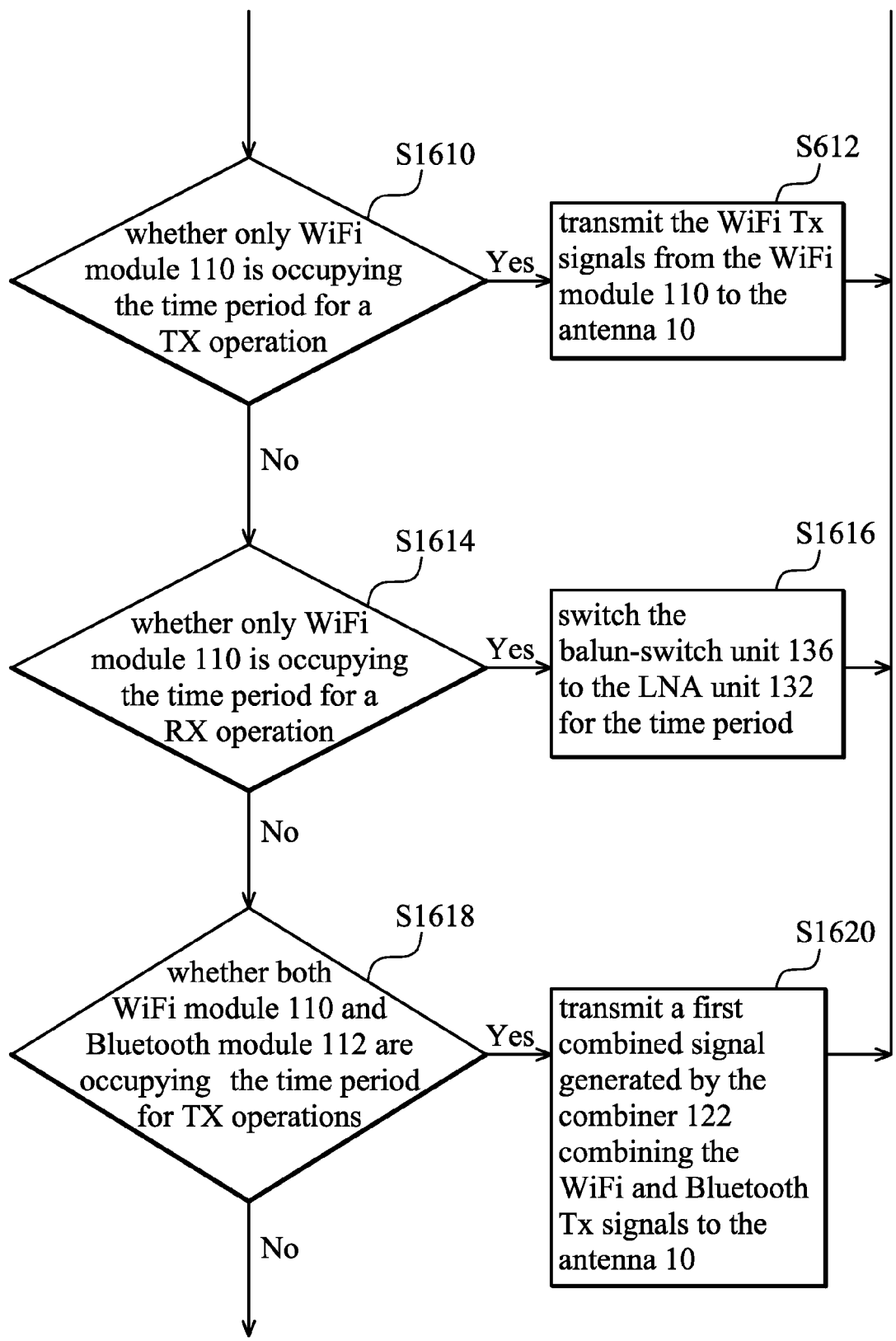
Figure 16C:
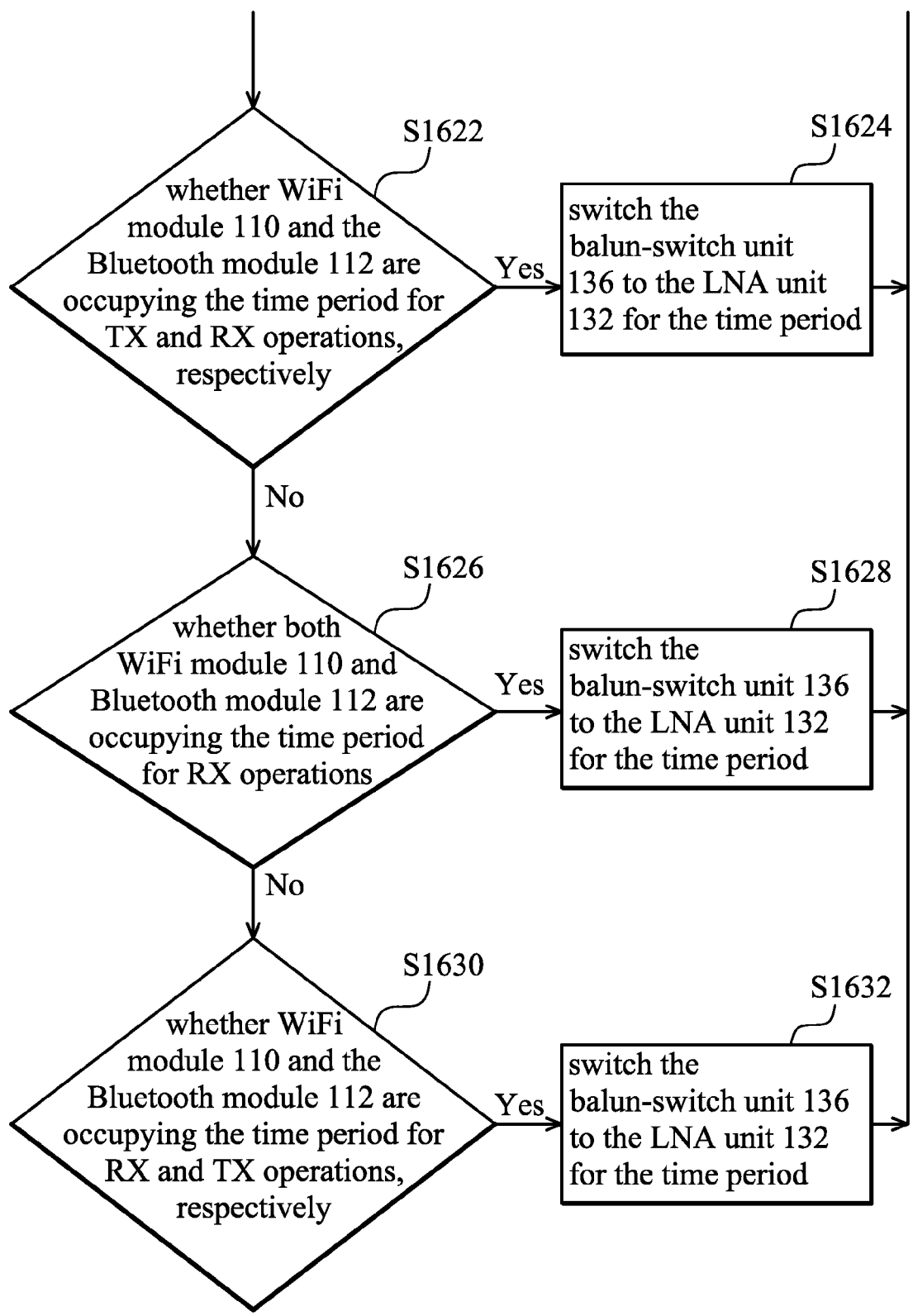

FIG. 16 depicts a flowchart for operating coexistence between WiFi and Bluetooth modules according to an embodiment of the invention. The procedure begins with obtaining information regarding potential operation(s) that is/are going to be performed by the WiFi module 110 and Bluetooth module 112 in a forthcoming time period. Subsequently, a series of inspections with respect to the obtained information are accordingly performed to determine whether only one or both of the WiFi module 110 and Bluetooth module 112 is/are occupying the time period, and determine whether the time period is occupied by the WiFi module 110 and/or Bluetooth module 112 for a Tx and/or an Rx operation. In FIG. 16, the information regarding potential operation(s) that is/are going to be performed by the WiFi module 110 and Bluetooth module 112 in a forthcoming time period is obtained (step S1600). Next, it is determined whether only the Bluetooth module 112 is occupying the time period for a Tx operation (step S1602). If so, the balun-switch unit 136 is switched to the buffer 144 for the time period (mode 3) (step S1604), thereby enabling the Bluetooth Tx signals to be transmitted from the Bluetooth module 112 via the buffer 144, the balun-switch unit 136, the port 2 and the through path between ports 44 and 42 in sequence to the antenna 10. In step S1602, if not, it is determined whether only the Bluetooth module 112 is occupying the time period for an Rx operation (step S1606). If so, the balun-switch unit 136 is switched to the LNA unit 132 for the time period (mode 2) (step S1608), thereby enabling the Bluetooth Rx signals to be received from the antenna 10 via the through path between ports 42 and 44, the port 2, the balun-switch unit 136, the LNA unit 132, the separator 124 and the buffer 142 in sequence and be transmitted to the Bluetooth module 112. In step 1606, if not, it is determined whether only the WiFi module 110 is occupying the time period for a Tx operation (step S1610). If so, the WiFi Tx signals are transmitted from the WiFi module 110 via the combiner 122, the PA unit 130, the balun unit 134, the port 1 and the coupled path between the ports 46 and 42 in sequence and be transmitted to the antenna 10 (mode 9) (step S1612). In step 1610, if not, it is determined whether only the WiFi module 110 is occupying the time period for an Rx operation (step S1614). If so, the balun-switch unit 136 is switched to the LNA unit 132 for the time period (mode 5) (step S1616), thereby enabling the WiFi Rx signals to be received from the antenna 10 via the through path between the ports 42 and 44, the port 2, the balun-switch unit 136, the LNA unit 132, the separator 124 and the buffer 140 in sequence and be transmitted to the WiFi module 110. In step S1614, if not, it is determined whether both the WiFi module 110 and the Bluetooth module 112 are occupying the time period for Tx operations (step S1618). If so, a first combined signal generated by the combiner 122 combining the to-be-transmitted WiFi and Bluetooth Tx signals is transmitted from the combiner 122 via the PA unit 130, the balun unit 134, the port 1 and the coupled path between the ports 46 and 42 in sequence and to the antenna 10 (mode 11) (step S1620). In step S1618, if not, it is determined whether the WiFi module 110 and the Bluetooth module 112 are occupying the time period for Tx and Rx operations, respectively (step S1622). If so, the balun-switch unit 136 is switched to the LNA unit 132 for the time period (mode 10) (step S1624), thereby enabling the WiFi Tx signals to be transmitted from the WiFi module 110 via the combiner 122, the PA unit 130, the balun unit 134, the port 1 and the coupled path between the ports 46 and 42 in sequence and to the antenna 10, and the Bluetooth Rx signals to be received from the antenna 10 via the through path between the ports 42 and 44, the port 2, the balun-switch unit 136, the LNA unit 132, the separator 124 and the buffer 142 in sequence and be transmitted to the Bluetooth module 112. In step S1622, if not, it is determined whether both the WiFi module 110 and the Bluetooth module 112 are occupying the time period for Rx operations (step S1626). If so, the balun-switch unit 136 is switched to the LNA unit 132 for the time period (mode 6) (step S1628), thereby enabling the WiFi and Bluetooth Rx signals that are obtained by the separator 124 separating a second combined signal received from the antenna 10 via the through path between ports 42 and 44, the port 2, the balun-switch unit 136 and the LNA unit 132, to be received respectively via the buffers 140 and 142 in sequence and be transmitted to the WiFi module 110 and the Bluetooth module 112. In step S1626, if not, it is determined whether the WiFi module 110 and the Bluetooth module 112 are occupying the time period for Rx and Tx operations, respectively (step S1630). If so, the balun-switch unit 136 is switched to the LNA unit 132 for the time period (mode 7) (step S1632), thereby enabling the WiFi Rx signals to be received from the antenna 10 via the through path between the ports 42 and 44, the port 2, the balun-switch unit 136, the LNA unit 132, the separator 124 and the buffer 140 in sequence and be transmitted to the WiFi module 110, and the Bluetooth Tx signals to be transmitted from the Bluetooth module 112 via the buffer 144, the balun-switch unit 136, the port 2 and the through path between the ports 44 and 42 in sequence to the antenna 10.

Figure 17A:
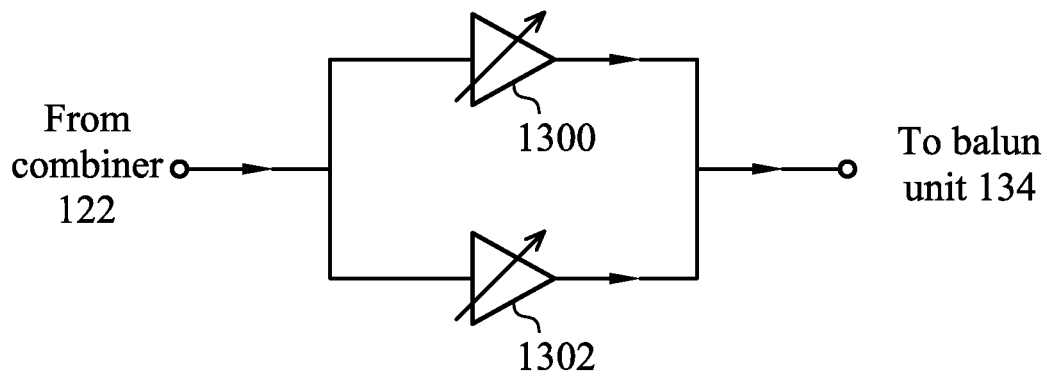
FIG. 17A depicts a diagram of a power amplifier (PA) unit according to an embodiment of the invention.
Figure 17B:
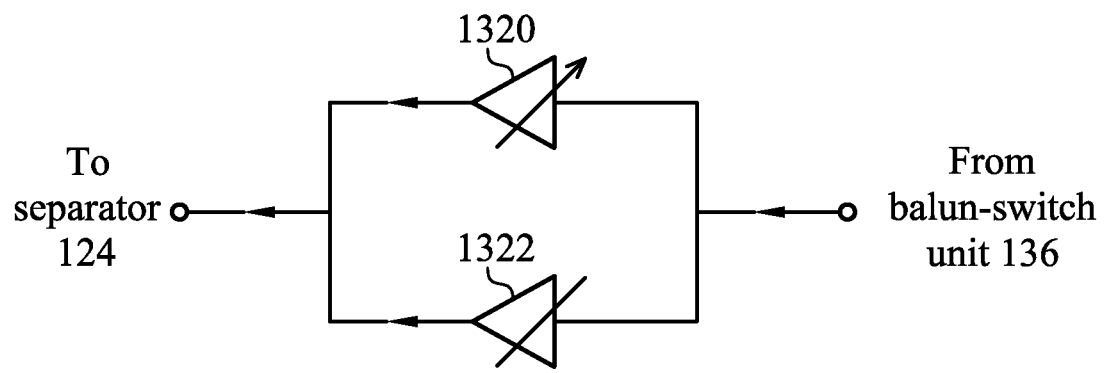
FIG. 17B depicts a diagram of a low noise amplifier (LNA) unit according to an embodiment of the invention.

In another embodiment of the invention, the PA unit 130 may comprise two power amplifiers 1300 and 1302, as shown in FIG. 17A. When the WiFi and Bluetooth Tx signals are to be transmitted simultaneously, the first combined signal obtained from the combiner 122 combining the WiFi and Bluetooth Tx signals may be delivered to the balun unit 134 through the PA 1300 or 1302, depending on requirements. In another case where there is only the WiFi or Bluetooth Tx signals to be transmitted from the WiFi module 110 or Bluetooth module 112, the transmitted WiFi or Bluetooth Tx signals may be delivered to the balun unit 134 through the PA 1300 or 1302, such as the PA 1300 for WiFi Tx signals and PA 1302 for Bluetooth Tx signals, or either case. Similarly, the LNA unit 132 may also comprise two low noise amplifiers 1320 and 1322, as shown in FIG. 17B. When a second combined signal, that contains WiFi and Bluetooth Rx signals to be received by the WiFi module 110 and the Bluetooth module 112, is received from the antenna 10, the second combined signal may be delivered to the separator 124 through the LNA 1320 or 1322, depending on requirements. In another case where there is only the WiFi or Bluetooth Rx signals to be received by the WiFi module 110 or Bluetooth module 112, the WiFi or Bluetooth Rx signals may be delivered to the separator 124 through the LNA 1320 or 1322, such as the LNA 1320 for WiFi Rx signals and LNA 1322 for Bluetooth Rx signals, or either case.

Figure 18:
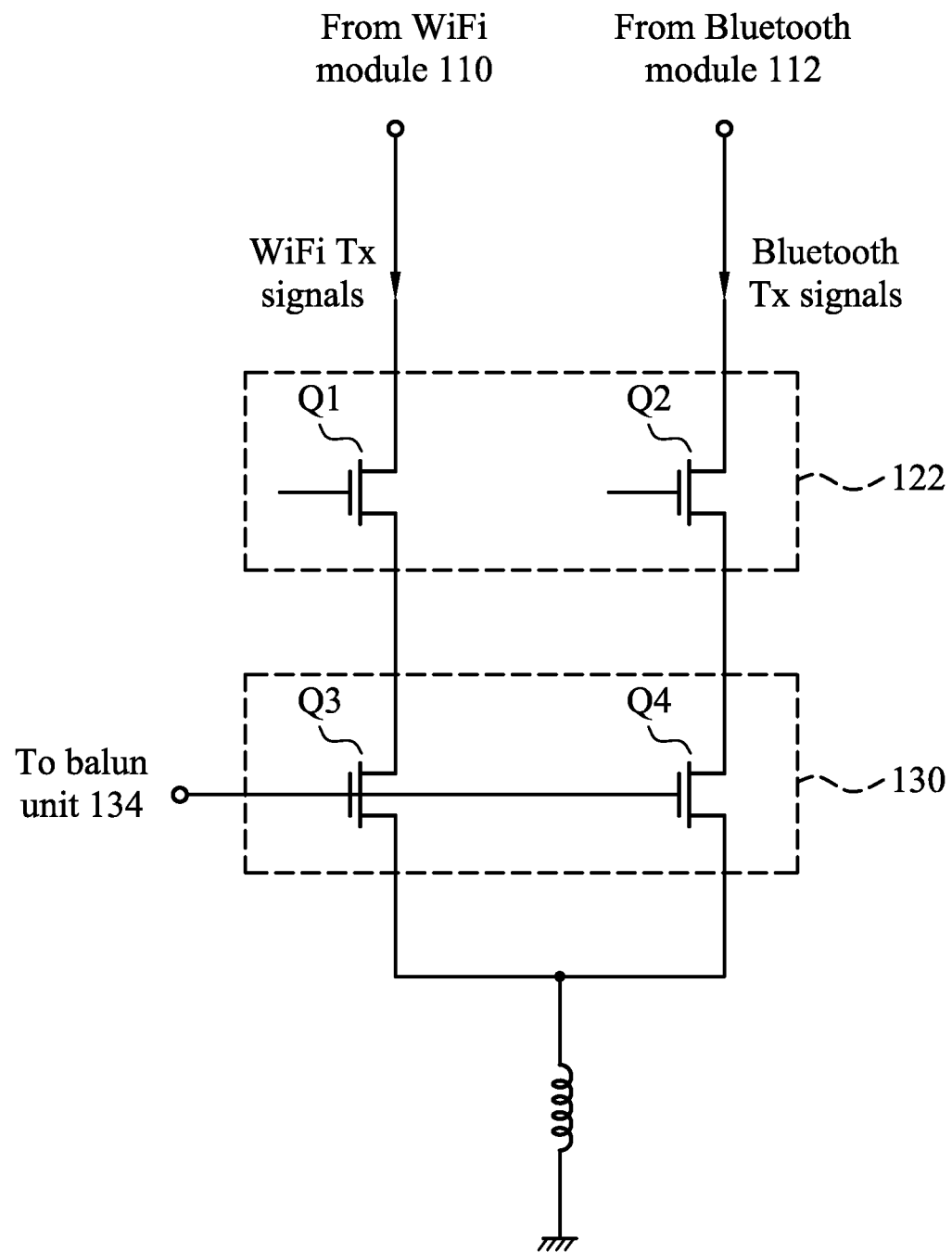
FIG. 18 depicts a diagram of a combiner according to an embodiment of the invention.

FIG. 18 depicts a general structure of a combiner along with a PA unit according to an embodiment of the invention. The combiner 122 may be implemented by two MOS transistors Q1 and Q2, each being connected to a different wireless module. The power amplifiers 1300 and 1302 of the PA unit 130 may be implemented as MOS transistors Q3 and Q4, respectively, with the gates thereof connected to the balun unit 134. The MOS transistors Q1 and Q2 are configured to receive the WiFi and Bluetooth Tx signals, respectively. When the transistor Q1 is on, the WiFi Tx signals are passed to the transistor Q3 by the combiner 122. Similarly, when the transistor Q2 is on, the Bluetooth Tx signals are passed to the transistor Q4 by the combiner 122. If both transistors Q1 and Q2 are on, the WiFi and Bluetooth Tx signals are combined and passed to the balun unit 134 by the combiner 122. The transistors Q3 and Q4 serve to amplify the signals from the combiner 122 and pass it to the balun unit 134.

Figure 19:
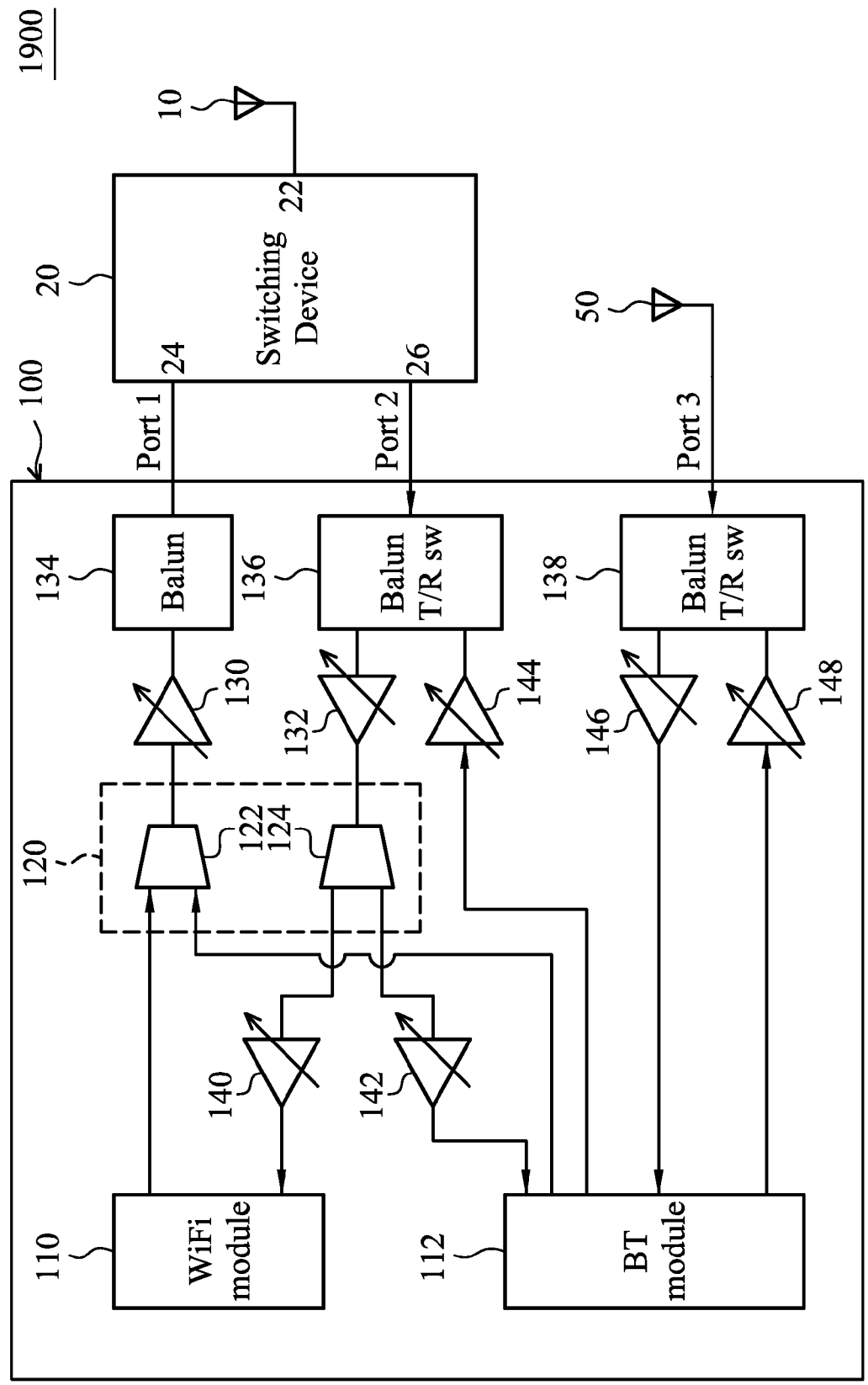
FIG. 19 depicts a diagram of a system for the coexistence between a plurality of wireless communication modules using dual antennas according to an embodiment of the invention.
Figure 20:
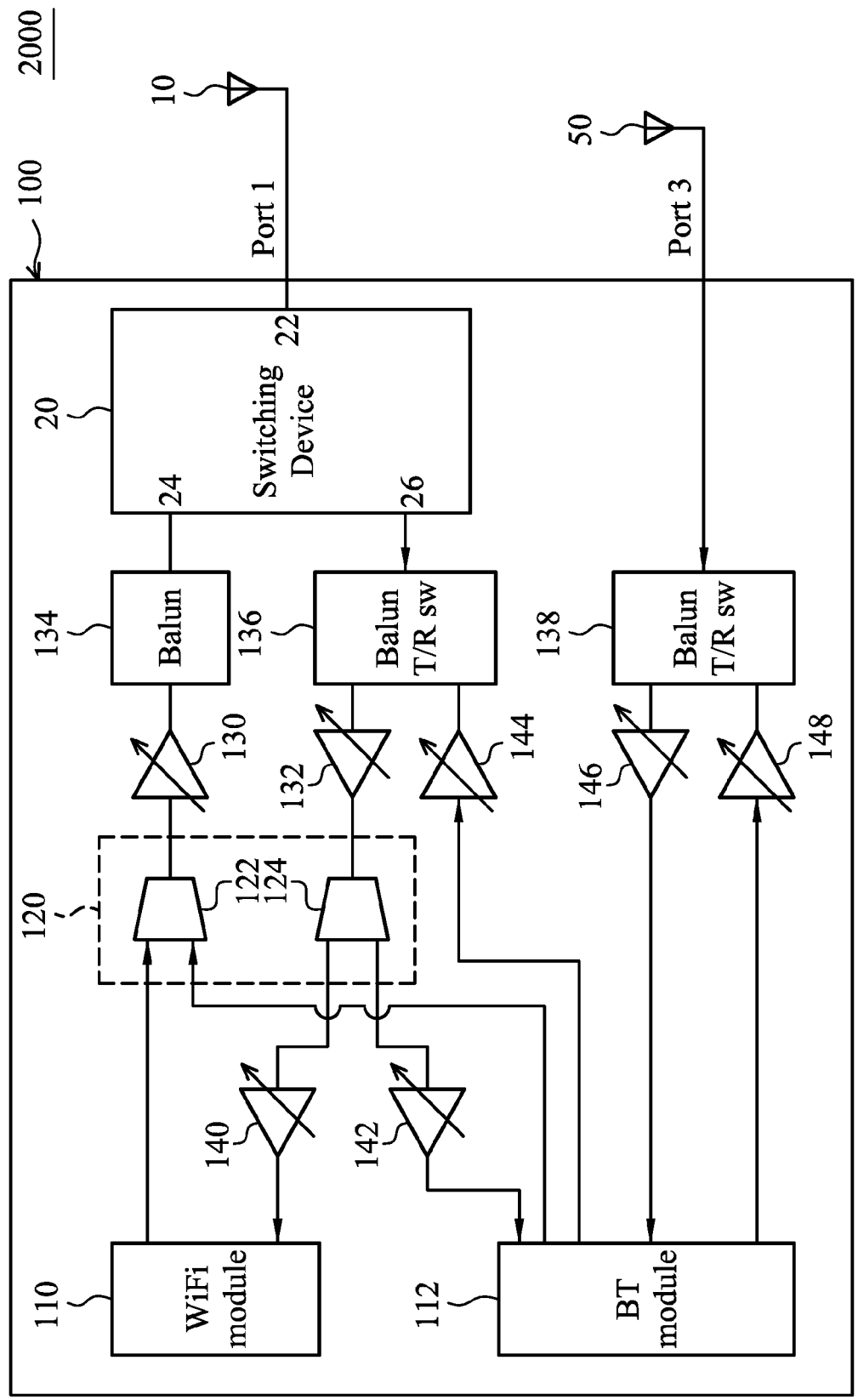
FIG. 20 depicts a diagram of a system for the coexistence between a plurality of wireless communication modules using dual antennas according to another embodiment of the invention.

Although the WiFi and Bluetooth wireless communication services are used for illustration of the invention, other wireless communication services may be applied, such as a Global Positioning System (GPS), WLAN, and Bluetooth, Zigbee, infrared, Ultra Wide Band (UWB), Near Field Communication (NFC) and Frequency Modulation (FM) modules. In addition, the system 400 may be modified to have dual antennas 10 and 50, as shown in FIG. 19. Similarly, the system 800 may also be modified to have dual antennas 10 and 50, as shown in FIG. 20.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for the coexistence between a plurality of wireless communication modules sharing an antenna, comprising:
a wireless communication chipset, comprising:
a first wireless communication module capable of transmitting and receiving first wireless communication signals;
a second wireless communication module capable of transmitting and receiving second wireless communication signals; and
a combine-separate unit capable of generating a first combined signal by combining the first and second wireless communication signals, and separating a second combined signal into the first and second wireless communication signals;
a switching device configured to selectively transmit the first combined signal or receive the second combined signal; and
a directional coupler having a first port coupled to the antenna, a second port connected to the first port via a first path for transmitting the first combined signal or receiving the second combined signal via the first path and the antenna, and a third port connected to the first port via a second path for transmitting or receiving the second wireless communication signals via the second path and the antenna.

2. The system as claimed in claim 1, wherein the first path between the first and second ports is a through path having a first path loss, and the second path between the first and third ports is a coupled path having a second path loss smaller than the first path loss.

3. The system as claimed in claim 2, wherein the directional coupler further comprises a fourth port isolated from the first port, connected to the second port via another coupled path, connected to the third port via another through path, and connected to an external node for impedance matching.

4. The system as claimed in claim 1, wherein the first wireless communication module is one of a WLAN, Bluetooth, Global Positioning System (GPS), Zigbee, infrared, Ultra Wide Band (UWB), Near Field Communication (NFC) and Frequency Modulation (FM) modules, and the second wireless communication module is another of the WLAN, Bluetooth, GPS, Zigbee, infrared, UWB, NFC and FM modules.

5. The system as claimed in claim 1, wherein the switching device is integrated in the wireless communication chipset.

6. The system as claimed in claim 1, wherein the switching device is a single-pole double-thrown (SPDT) switch.

7. The system as claimed in claim 6, wherein the SPDT switch is implemented by a double-pole double-thrown (DPDT) switch with a terminal connected to an external node for impedance matching.

8. The system as claimed in claim 1, wherein the switching device is disposed outside the wireless communication chipset.

9. A system for the coexistence between a plurality of wireless communication modules sharing an antenna, comprising:
a wireless communication chipset, comprising:
a first wireless communication module capable of transmitting and receiving first wireless communication signals;
a second wireless communication module capable of transmitting and receiving second wireless communication signals;
a combine-separate unit capable of generating a first combined signal by combining the first and second wireless communication signals, and separating a second combined signal into the first and second wireless communication signals; and
a switching device configured to selectively transmit the first combined signal or receive the second combined signal via the antenna; and
a balun-switch unit configured to selectively transmit or receive the second wireless communication signals via another antenna.

10. The system as claimed in claim 9, wherein the wireless communication chipset further comprises:
a power amplifier unit configured to amplify the first combined signal before being transmitted by the antenna.

11. The system as claimed in claim 10, wherein the power amplifier unit comprises:
a first power amplifier; and
a second power amplifier,
wherein only one of the first and second power amplifiers is configured to amplify the first combined signal before being transmitted by the antenna.

12. The system as claimed in claim 9, wherein the switching device is integrated in the wireless communication chipset.

13. The system as claimed in claim 9, wherein the wireless communication chipset further comprises:
a low noise amplifier (LNA) unit configured to amplify the second combined signal before being separated by the combine-separate unit.

14. The system as claimed in claim 13, wherein the LNA unit comprises:
a first low noise amplifier; and
a second low noise amplifier,
wherein only one of the first and second low noise amplifiers is configured to amplify the second combined signal before being separated by the combine-separate unit.

15. A system for the coexistence between a plurality of wireless communication modules sharing an antenna, comprising:
a wireless communication chipset, comprising:
a first wireless communication module capable of transmitting and receiving first wireless communication signals;
a second wireless communication module capable of transmitting and receiving second wireless communication signals; and
a combine-separate unit capable of generating a first combined signal by combining the first and second wireless communication signals, and separating a second combined signal into the first and second wireless communication signals; and
a hybrid coupler having a first port coupled to the antenna, a second port connected to the first port via a first path for transmitting the first combined signal or receiving the second combined signal via the first path and the antenna, and a third port connected to the first port via a second path for transmitting or receiving the second wireless communication signals via the second path and the antenna.

16. The system as claimed in claim 15, wherein the first and second paths have a path loss of substantially 3 dB.

17. A system for the coexistence between a plurality of wireless communication modules sharing an antenna, comprising:
a wireless communication chipset, comprising:
a first wireless communication module capable of transmitting and receiving first wireless communication signals;
a second wireless communication module capable of transmitting and receiving second wireless communication signals; and
a combine-separate unit capable of generating a first combined signal by combining the first and second wireless communication signals, and separating a second combined signal into the first and second wireless communication signals;
a switching device configured to selectively transmit the first combined signal or receive the second combined signal; and
a power splitter having a first port coupled to the antenna, a second port connected to the first port via a first path for transmitting the first combined signal or receiving the second combined signal via the first path and the antenna, and a third port connected to the first port via a second path for transmitting or receiving the second wireless communication signals via the second path and the antenna.

18. The system as claimed in claim 17, wherein the first path between the first and second ports has a first path loss, and the second path between the first and third ports has a second path loss different from the first path loss.

19. A system for the coexistence between a plurality of wireless communication modules sharing an antenna, comprising:
a wireless communication chipset, comprising:
a first wireless communication module capable of transmitting and receiving first wireless communication signals;
a second wireless communication module capable of transmitting and receiving second wireless communication signals; and
a combine-separate unit capable of generating a first combined signal by combining the first and second wireless communication signals, and separating a second combined signal into the first and second wireless communication signals; and
a power divider having a first port coupled to the antenna, a second port connected to the first port via a first path for transmitting the first combined signal or receiving the second combined signal via the first path and the antenna, and a third port connected to the first port via a second path for transmitting or receiving the second wireless communication signals via the second path and the antenna.

* * * * *